US009656717B2

United States Patent
Shirai et al.

(10) Patent No.: US 9,656,717 B2
(45) Date of Patent: May 23, 2017

(54) BICYCLE OPERATING DEVICE

(71) Applicant: SHIMANO INC., Sakai (JP)

(72) Inventors: Toyoto Shirai, Sakai (JP); Kazutaka Fukao, Sakai (JP)

(73) Assignee: SHIMANO INC., Sakai (JP)

( * ) Notice: Subject to any disclaimer, the term of this patent is extended or adjusted under 35 U.S.C. 154(b) by 34 days.

(21) Appl. No.: 14/615,578

(22) Filed: Feb. 6, 2015

(65) Prior Publication Data
US 2016/0229481 A1 Aug. 11, 2016

(51) Int. Cl.
B62K 23/02 (2006.01)
B62M 25/04 (2006.01)
B62K 23/06 (2006.01)
F16C 1/18 (2006.01)
B62J 1/08 (2006.01)

(52) U.S. Cl.
CPC .............. *B62K 23/02* (2013.01); *B62K 23/06* (2013.01); *B62M 25/04* (2013.01); *B62J 2001/085* (2013.01); *F16C 1/18* (2013.01)

(58) Field of Classification Search
CPC ........ B62K 23/02; B62K 23/06; B62M 25/04; B62M 25/045; B60T 11/046; F16C 1/12; F16C 1/18; B62J 2001/085
See application file for complete search history.

(56) References Cited

U.S. PATENT DOCUMENTS

| 5,577,969 | A  | * | 11/1996 | Watarai ................. | B62M 9/122 |
|-----------|----|---|---------|--------------------------|------------|
|           |    |   |         |                          | 474/78     |
| 5,682,794 | A  | * | 11/1997 | Shibata ................. | B62K 23/06 |
|           |    |   |         |                          | 74/142     |
| 9,327,795 | B2 | * | 5/2016  | Miki ..................... | B62K 23/06 |
| 9,428,247 | B2 | * | 8/2016  | Kosaka ................. | B62M 25/08 |
| 2013/0081507 | A1 |   | 4/2013  | Fukao et al.             |            |
| 2014/0208887 | A1 | * | 7/2014  | Kosaka ................. | B62M 25/08 |
|           |    |   |         |                          | 74/523     |
| 2015/0232148 | A1 | * | 8/2015  | Shirai .................. | B62K 23/04 |
|           |    |   |         |                          | 74/505     |
| 2015/0291248 | A1 | * | 10/2015 | Fukao ................... | B62K 23/02 |
|           |    |   |         |                          | 74/501.6   |
| 2015/0291249 | A1 | * | 10/2015 | Fukao ................... | B62K 23/02 |
|           |    |   |         |                          | 74/501.6   |
| 2016/0059933 | A1 | * | 3/2016  | Miki ..................... | B62K 23/06 |
|           |    |   |         |                          | 74/502.2   |

* cited by examiner

*Primary Examiner* — Adam D Rogers
(74) *Attorney, Agent, or Firm* — Mori & Ward, LLP

(57) ABSTRACT

A bicycle operating device comprises a base member, an operating member, and a movable member. The movable member is configured to move an operation cable in a pulling direction to operate a bicycle component in response to a first movement of the operating member. The movable member is configured such that the operation cable is movable in a releasing direction in response to a release of the operating member from a first operated position. The movable member is configured to move the operation cable in the pulling direction to operate the bicycle component in response to a second movement of the operating member. The movable member is configured such that the operation cable is movable in the releasing direction in response to a release of the operating member from a second operated position.

29 Claims, 25 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a base member, an operating member, and a movable member. The base member is configured to be mounted to a bicycle body. The operating member is movable relative to the base member from a rest position to a first operated position and movable relative to the base member from the rest position to a second operated position. The rest position is disposed between the first operated position and the second operated position. The movable member is movable relative to the base member to move an operation cable in a pulling direction and a releasing direction opposite to the pulling direction. The movable member is configured to move the operation cable in the pulling direction to operate a bicycle component in response to a first movement of the operating member from the rest position to the first operated position. The movable member is configured such that the operation cable is movable in the releasing direction in response to a release of the operating member from the first operated position. The movable member is configured to move the operation cable in the pulling direction to operate the bicycle component in response to a second movement of the operating member from the rest position to the second operated position. The movable member is configured such that the operation cable is movable in the releasing direction in response to a release of the operating member from the second operated position.

In accordance with a second aspect of the present invention, the bicycle operating device according to the first aspect is configured so that the movable member is movable relative to the base member from a release position to a first pulling position in response to the first movement of the operating member. The movable member is movable relative to the base member from the release position to a second pulling position in response to the second movement of the operating member. The first amount of movement of the movable member from the release position to the first pulling position is different from a second amount of movement of the movable member from the release position to the second pulling position.

In accordance with a third aspect of the present invention, the bicycle operating device according to the second aspect is configured so that the first amount of movement of the movable member is smaller than the second amount of movement of the movable member.

In accordance with a fourth aspect of the present invention, the bicycle operating device according to the second aspect is configured so that the movable member is movable relative to the base member from the release position to the first pulling position to move the operation cable in the pulling direction. The movable member is movable relative to the base member from the release position to the second pulling position to move the operation cable in the pulling direction.

In accordance with a fifth aspect of the present invention, the bicycle operating device according to the first aspect further comprises a biasing structure configured to bias the movable member relative to the base member so that the operation cable is moved relative to the base member in the releasing direction in response to the release of the operating member from each of the first operated position and the second operated position.

In accordance with a sixth aspect of the present invention, the bicycle operating device according to the fifth aspect is configured so that the movable member is movable relative to the base member from a release position to a first pulling position in response to the first movement of the operating member. The movable member is movable relative to the base member from the release position to a second pulling position in response to the second movement of the operating member. The biasing structure is configured to bias the movable member from the first pulling position toward the release position to move the operation cable in the releasing direction in response to the release of the operating member from the first operated position. The biasing structure is configured to bias the movable member from the second pulling position toward the release position to move the operation cable in the releasing direction in response to the release of the operating member from the second operated position.

In accordance with a seventh aspect of the present invention, the bicycle operating device according to the first aspect is configured so that the movable member includes a cable attachment portion to which an inner wire of the operation cable is to be attached.

In accordance with an eighth aspect of the present invention, the bicycle operating device according to the first aspect is configured so that the base member includes an outer-casing receiving portion configured to receive an outer casing of the operation cable.

In accordance with a ninth aspect of the present invention, the bicycle operating device according to the first aspect is configured so that the base member includes a guide portion configured to guide the operation cable in the pulling direction.

In accordance with a tenth aspect of the present invention, the bicycle operating device according to the first aspect is configured so that the operating member is pivotably coupled to the movable member about a pivot axis.

In accordance with an eleventh aspect of the present invention, the bicycle operating device according to the tenth aspect is configured so that the movable member is rotatable relative to the base member about a rotational axis. The pivot axis of the operating member is parallel to the rotational axis of the movable member.

In accordance with a twelfth aspect of the present invention, the bicycle operating device according to the first aspect is configured so that the movable member is rotatable relative to the base member about a center axis of a tubular part of the bicycle body in a state where the base member is fixedly attached to the tubular part.

In accordance with a thirteenth aspect of the present invention, the bicycle operating device according to the first aspect is configured so that the base member is configured to be fixedly attached to a tubular part of the bicycle body.

The movable member is rotatable relative to the base member about a rotational axis.

In accordance with a fourteenth aspect of the present invention, the bicycle operating device according to the first aspect is configured so that the base member includes a first contact portion contactable with the operating member. The operating member is in contact with the first contact portion in a first operated state where the operating member is disposed at the first operated position.

In accordance with a fifteenth aspect of the present invention, the bicycle operating device according to the fourteenth aspect is configured so that the operating member is in contact with the first contact portion in a rest state where the operating member is disposed at the rest position.

In accordance with a sixteenth aspect of the present invention, the bicycle operating device according to the fourteenth aspect is configured so that the base member includes a second contact portion contactable with at least one of the operating member and the movable member. The at least one of the operating member and the movable member is in contact with the second contact portion in a second operated state where the operating member is disposed at the second operated position.

In accordance with a seventeenth aspect of the present invention, the bicycle operating device according to the sixteenth aspect is configured so that the operating member is pivotably coupled to the movable member about a pivot axis between a first position and a second position. The movable member includes a first positioning portion and a second positioning portion. The first positioning portion is contactable with the operating member in a state where the operating member is disposed at the first position relative to the base member. The second positioning portion is contactable with the operating member in a state where the operating member is disposed at the second position relative to the base member.

In accordance with an eighteenth aspect of the present invention, the bicycle operating device according to the seventeenth aspect is configured so that the operating member is in contact with the first contact portion and the first positioning portion in the first operated state. The operating member is in contact with the second contact portion and the second positioning portion in the second operated state.

In accordance with a nineteenth aspect of the present invention, the bicycle operating device according to the eighteenth aspect is configured so that the operating member is in contact with the first contact portion and the second positioning portion in a rest state where the operating member is disposed at the rest position relative to the base member.

In accordance with a twentieth aspect of the present invention, the bicycle operating device according to the first aspect is configured so that the operating member is pivotable relative to the base member from the rest position to the first operated position about a first pivot axis. The operating member is pivotable relative to the base member from the rest position to the second operated position about a second pivot axis different from the first pivot axis.

In accordance with a twenty-first aspect of the present invention, the bicycle operating device according to the twentieth aspect is configured so that the movable member is rotatable relative to the base member about a rotational axis. The second pivot axis coincides with the rotational axis. The first pivot axis is parallel to the second pivot axis and is provided radially outward of the second pivot axis.

In accordance with a twenty-second aspect of the present invention, the bicycle operating device according to the twentieth aspect is configured so that the movable member includes a first contact part. The operating member includes a second contact part contactable with the first contact part. The second contact part is in contact with the first contact part in a first operated state where the operating member is disposed at the first operated position. The second contact part is in contact with the first contact part in a second operated state where the operating member is disposed at the second operated position.

In accordance with a twenty-third aspect of the present invention, the bicycle operating device according to the twentieth aspect is configured so that the movable member includes a third contact part. The operating member includes a fourth contact part contactable with the third contact part. The fourth contact part is in contact with the third contact part to position the operating member at the first operated position relative to the base member in the first operated state. The fourth contact part is spaced apart from the third contact part in the second operated state.

In accordance with a twenty-fourth aspect of the present invention, the bicycle operating device according to the twentieth aspect is configured so that the movable member includes a fifth contact part. The operating member includes a sixth contact part contactable with the fifth contact part. The sixth contact part is spaced apart from the fifth contact part in the first operated state. The sixth contact part is in contact with the fifth contact part to position the operating member at the second operated position relative to the base member in the second operated state.

In accordance with a twenty-fifth aspect of the present invention, the bicycle operating device according to the twentieth aspect is configured so that the operating member includes an elongated hole. The base member includes a pivot shaft extending through the elongated hole and defining the first pivot axis. The elongated hole and the pivot shaft define an angular range where the operating member is pivotable relative to the base member about the second pivot axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
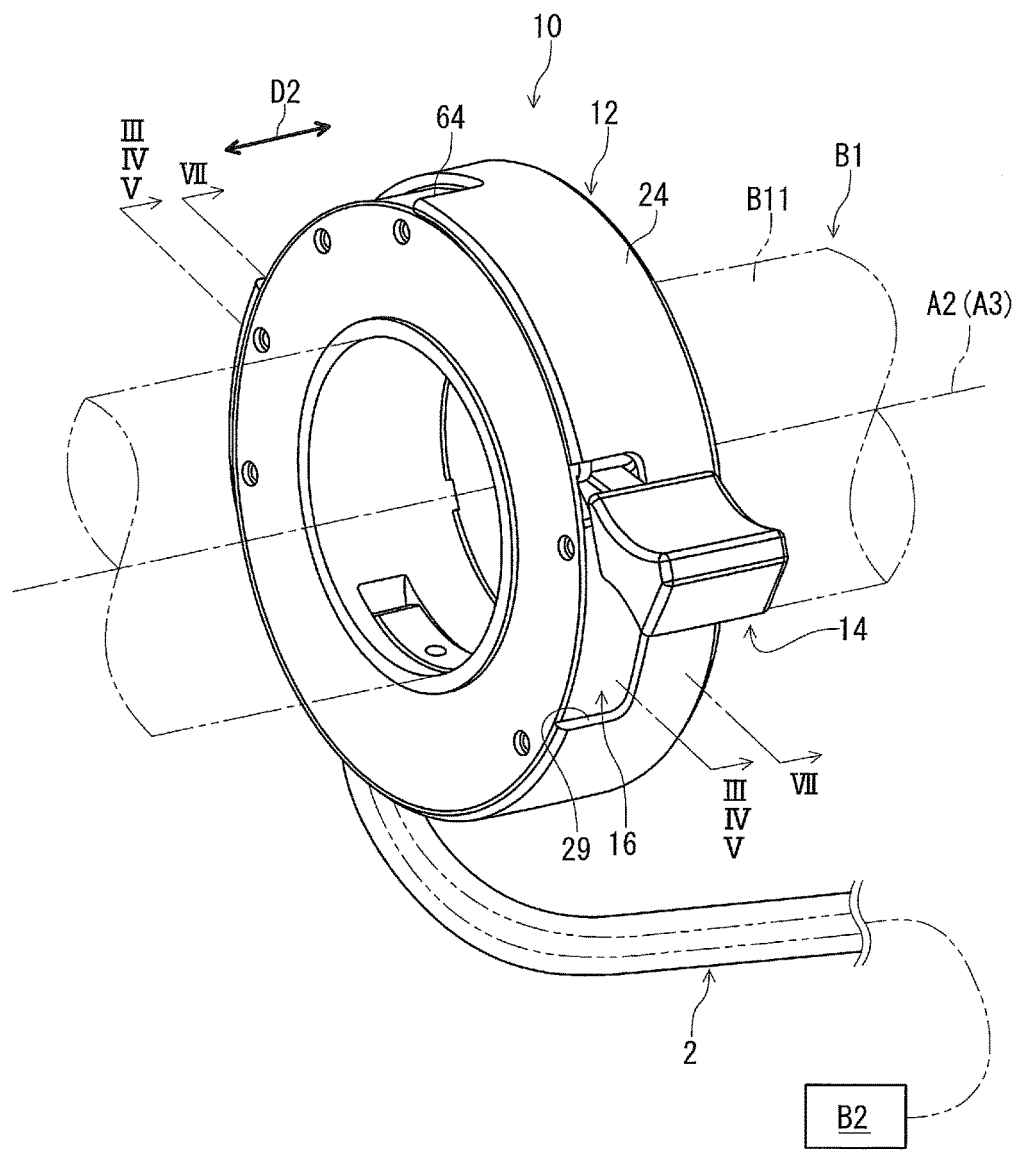
FIG. 1 is a perspective view of a bicycle operating device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a bicycle body B1. The bicycle operating device 10 is configured to operate a bicycle component B2 configured to be operated via an operation cable 2 such as a Bowden cable. The bicycle component B2 can be a cable-operated device. Possible examples of the bicycle component B2 include an adjustable seatpost assembly, a bicycle transmission, a suspension, and an intermediate take-up device. For example, the intermediate take-up device is operatively connected to the bicycle operating device 10 via the operation cable 2. The intermediate take-up device is configured to wind and unwind another operation cable to operate a cable-operated device in response to movement of the operation cable 2.

The bicycle operating device 10 is a left hand side control device operated by the rider's left hand. It will be apparent to those skilled in the bicycle field that the configuration of the bicycle operating device 10 can be adapted to a right hand side control device that is operated by the rider's right hand.

In the present application, the following directional terms "forward", "rearward", "left", "right", "upward" and "downward" as well as any other similar directional terms refer to those directions which are determined on the basis of the rider who sits on a bicycle seat (not shown) of a bicycle with facing a bicycle handlebar (not shown). Accordingly, these terms, as utilized to describe the bicycle operating device 10, should be interpreted relative to a bicycle equipped with the bicycle operating device 10 as used in an upright riding position on a horizontal surface.

As seen in FIG. 1, the bicycle operating device 10 comprises a base member 12, an operating member 14, and a movable member 16. The base member 12 is configured to be mounted to the bicycle body B1. The base member 12 is configured to be fixedly attached to a tubular part B11 of the bicycle body B1. Possible examples of the bicycle body B1 include a bicycle handlebar, a stem, and a bicycle frame. In the illustrated embodiment, the base member 12 is configured to be fixedly attached to the bicycle handlebar of the bicycle body B1. However, the base member 12 can be fixedly attached to other parts of the bicycle body B1 if needed and/or desired.

Figure 2:
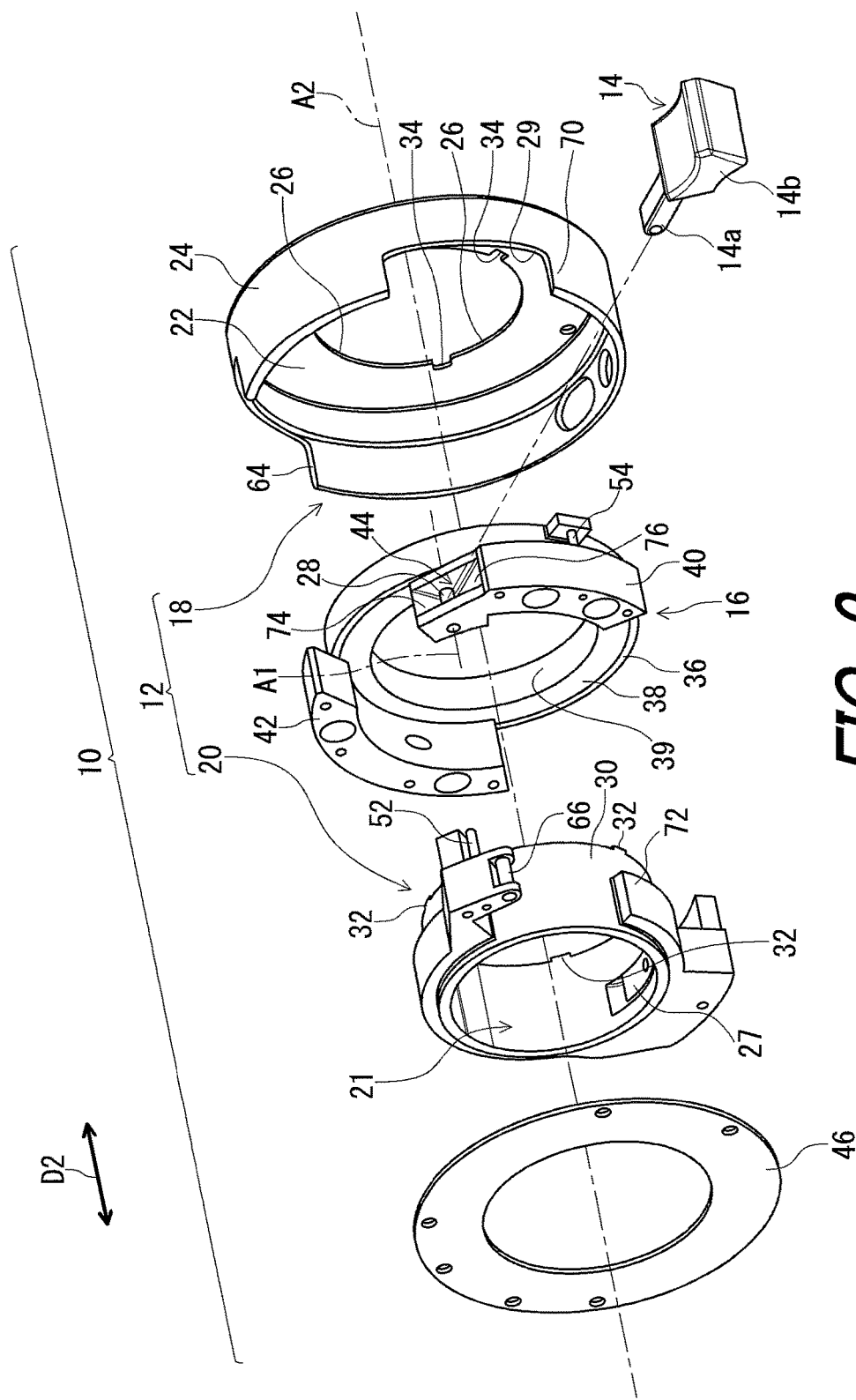
FIG. 2 is an exploded perspective view of the bicycle operating device illustrated in FIG. 1.

As seen in FIG. 2, the base member 12 includes a housing 18 and a support body 20. The support body 20 has an annular shape and includes an attachment opening 21 through which the tubular part B11 of the bicycle body B1 (FIG. 1) is to extend. The housing 18 includes a first housing portion 22 and a second housing portion 24. The first housing portion 22 has an annular shape and include a housing opening 26 through which the tubular part B11 of the bicycle body B1 (FIG. 1) is to extend. The second housing portion 24 protrudes from an outer peripheral edge of the first housing portion 22. The support body 20 is provided in the housing 18 and is secured to the housing 18. In the illustrated embodiment, the support body 20 is secured to the first housing portion 22.

The base member 12 includes a securing member 27 provided in the attachment opening 21. The securing member 27 is radially movable relative to the support body 20 to sandwich the tubular part B11 between the securing member 27 and an inner peripheral surface of the support body 20.

Figure 3:
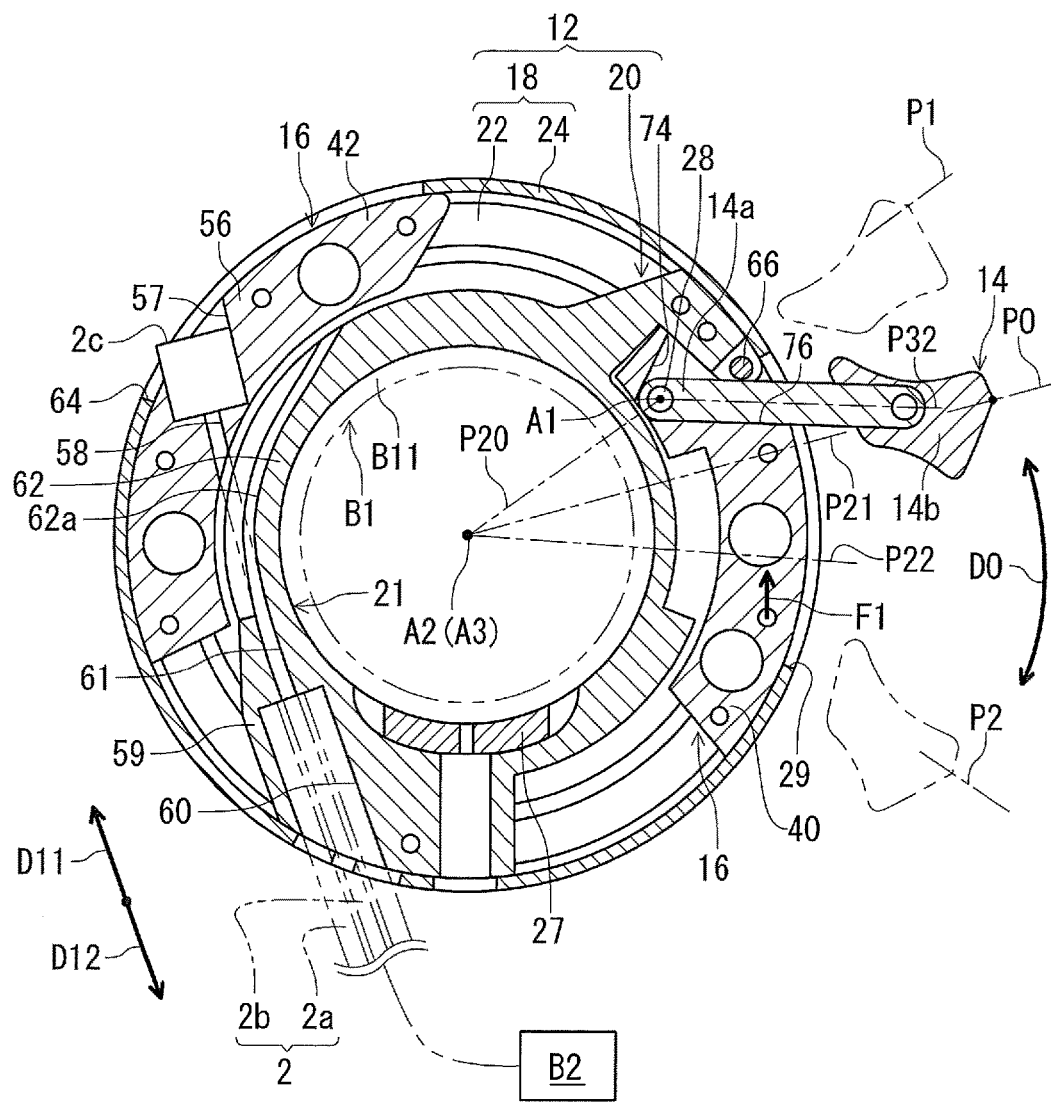
FIG. 3 is a cross-sectional view of the bicycle operating device taken along line III-III of FIG. 1 (a rest position)

As seen in FIG. 3, the operating member 14 is movable relative to the base member 12 from a rest position P0 to a first operated position P1. The operating member 14 is movable relative to the base member 12 from the rest position P0 to a second operated position P2. The operating member 14 is configured to be operated by a user between the rest position P0 and the first operated position P1 and between the rest position P0 and the second operated position P2.

The movable member 16 is movable relative to the base member 12 to move the operation cable 2 in a pulling direction D11 and a releasing direction D12 opposite to the pulling direction D11. In the illustrated embodiment, the operation cable 2 includes an outer casing 2a and an inner wire 2b movably provided in the outer casing 2a. The movable member 16 is movable relative to the base member 12 to move the inner wire 2b relative to the base member 12 in the pulling direction D11 and the releasing direction D12.

In the present application, the term "rest position" as used herein refers to a position at which a movable part (e.g., the operating member 14) remains stationary in a state where the movable part is not operated by a user (e.g., a rider). The term "operated position" as used herein refers to a position at which the movable part has been operated by a user (e.g., a rider) to perform operation of a bicycle component.

As seen in FIG. 3, the rest position P0 is disposed between the first operated position P1 and the second operated position P2. In the illustrated embodiment, the operating member 14 is pivotably coupled to the movable member 16 about a pivot axis A1. The operating member 14 includes a pivot end 14a and an operating end 14b opposite to the pivot end 14a. The operating member 14 extends between the pivot end 14a and the operating end 14b. The movable member 16 includes a pivot pin 28. The pivot end 14a is pivotably coupled to the movable member 16 about the pivot axis A1 via the pivot pin 28. The operating end 14b is provided outside the base member 12 and is configured to be operated by a user. The rest position P0, the first operated position P1, and the second operated position P2 are defined based on a position of the operating end 14b of the operating member 14 relative to the base member 12.

The operating end 14b is movable relative to the base member 12 along an operating direction D0 defined around a rotational axis A2 of the movable member 16. The rest position P0 is disposed between the first operated position P1 and the second operated position P2 in the operating direction D0. The first operated position P1 is disposed on an opposite side of the second operated position P2 relative to the rest position P0 in the operating direction D0.

Figure 4:
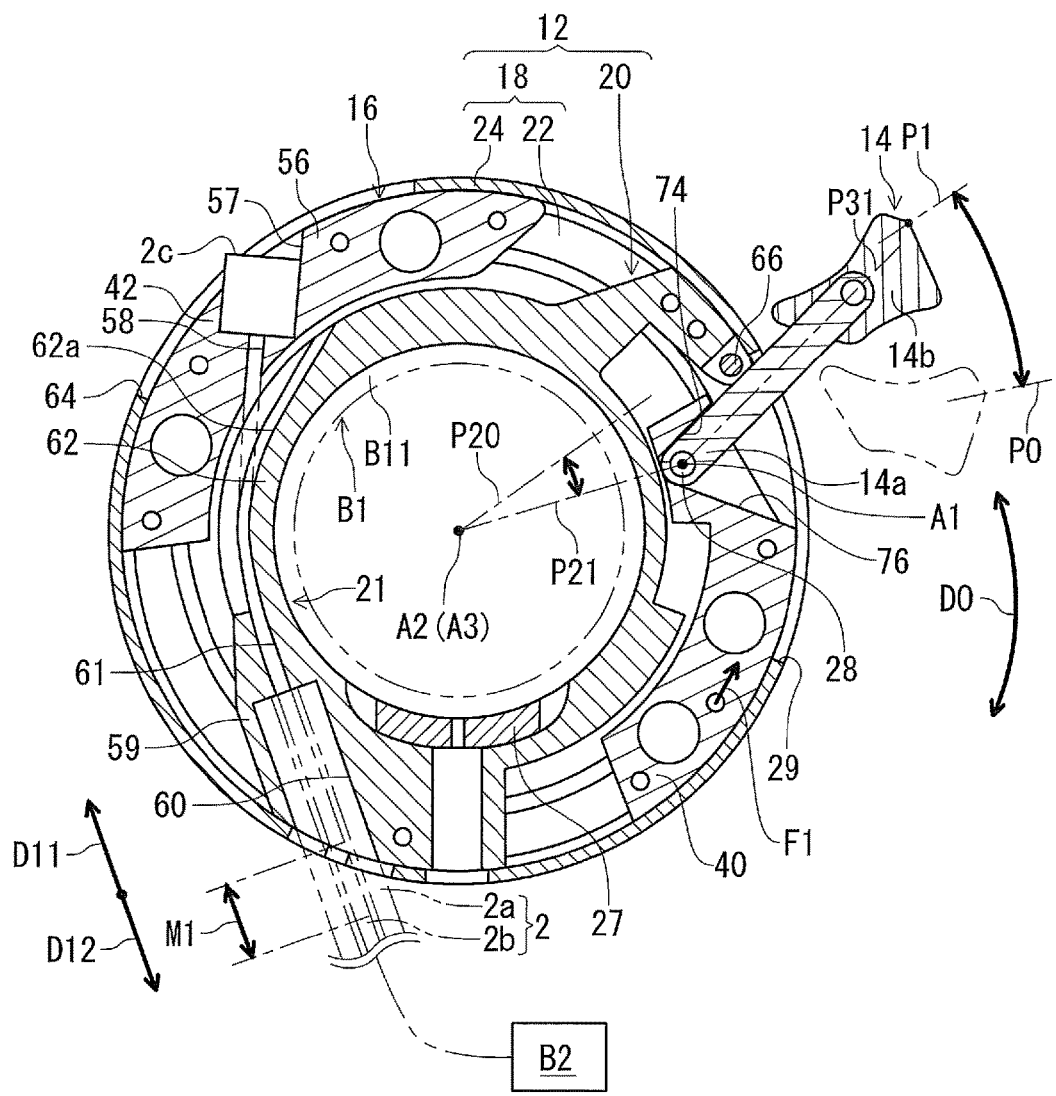
FIG. 4 is a cross-sectional view of the bicycle operating device taken along line IV-IV of FIG. 1 (a first operated position)
Figure 5:
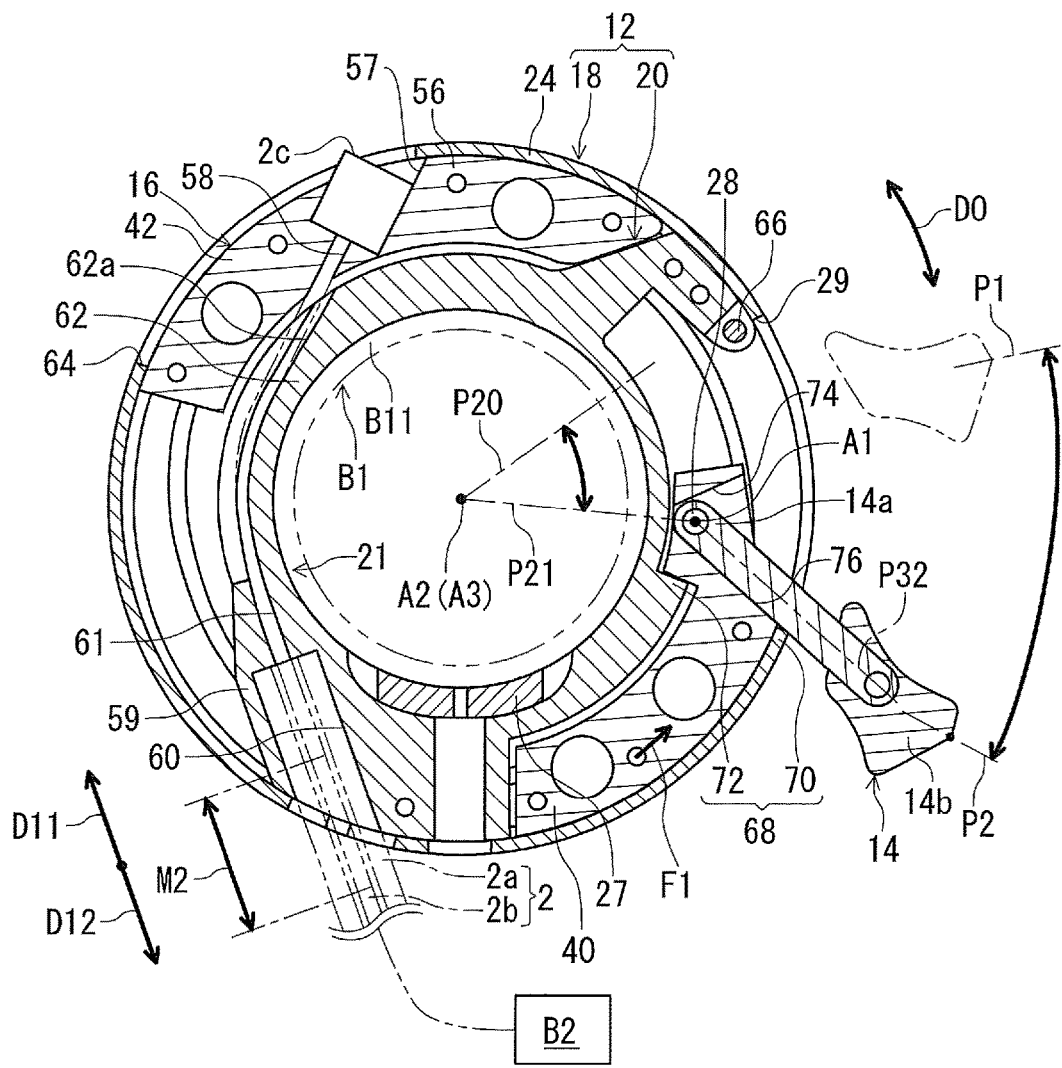
FIG. 5 is a cross-sectional view of the bicycle operating device taken along line V-V of FIG. 1 (a second operated position)

As seen in FIG. 2, the base member 12 includes an opening 29 provided on the second housing portion 24. More specifically, the opening 29 is provided on the outer peripheral surface of the housing portion 24. As seen in FIGS. 3 to 5, the operating member 14 extends through the opening 29. The operating member 14 is movable within the opening 29 relative to the base member 12.

As seen in FIGS. 3 and 4, the movable member 16 is configured to move the operation cable 2 in the pulling direction D11 to operate the bicycle component B2 in response to a first movement of the operating member 14 from the rest position P0 to the first operated position P1. The movable member 16 is configured such that the operation cable 2 is movable in the releasing direction D12 in response to a release of the operating member 14 from the first operated position P1.

As seen in FIGS. 3 and 5, the movable member 16 is configured to move the operation cable 2 in the pulling direction D11 to operate the bicycle component in response to a second movement of the operating member 14 from the rest position P0 to the second operated position P2. The movable member 16 is configured such that the operation cable 2 is movable in the releasing direction D12 in response to a release of the operating member 14 from the second operated position P2.

As seen in FIGS. 3 and 4, the movable member 16 is movable relative to the base member 12 from a release position P20 to a first pulling position P21 in response to the first movement of the operating member 14. The movable member 16 is movable relative to the base member 12 from the release position P20 to the first pulling position P21 to move the operation cable 2 in the pulling direction D11.

As seen in FIGS. 3 and 5, the movable member 16 is movable relative to the base member 12 from the release position P20 to a second pulling position P22 in response to the second movement of the operating member 14. The movable member 16 is movable relative to the base member 12 from the release position P20 to the second pulling position P22 to move the operation cable 2 in the pulling direction D11.

As seen in FIGS. 3 to 5, a first amount of movement M1 of the movable member 16 from the release position P20 to the first pulling position P21 is different from a second amount of movement M2 of the movable member 16 from the release position P20 to the second pulling position P22. In the illustrated embodiment, the first amount of movement M1 of the movable member 16 is smaller than the second amount of movement M2 of the movable member 16. However, the first amount of movement M1 of the movable member 16 can be larger than the second amount of movement M2 of the movable member 16 if needed and/or desired. Further, the first amount of movement M1 of the movable member 16 can be equal to the second amount of movement M2 of the movable member 16 if needed and/or desired.

In the illustrated embodiment, as seen in FIGS. 3 to 5, the movable member 16 is rotatable relative to the base member 12 about the rotational axis A2. The pivot axis A1 of the operating member 14 is parallel to the rotational axis A2 of the movable member 16. In the illustrated embodiment, the support body 20 is configured to rotatably support the movable member 16 about the rotational axis A2. As seen in FIG. 1, the movable member 16 is rotatable relative to the base member 12 about a center axis A3 of the tubular part B11 of the bicycle body B1 in a state where the base member 12 is fixedly attached to the tubular part B11.

Figure 6:
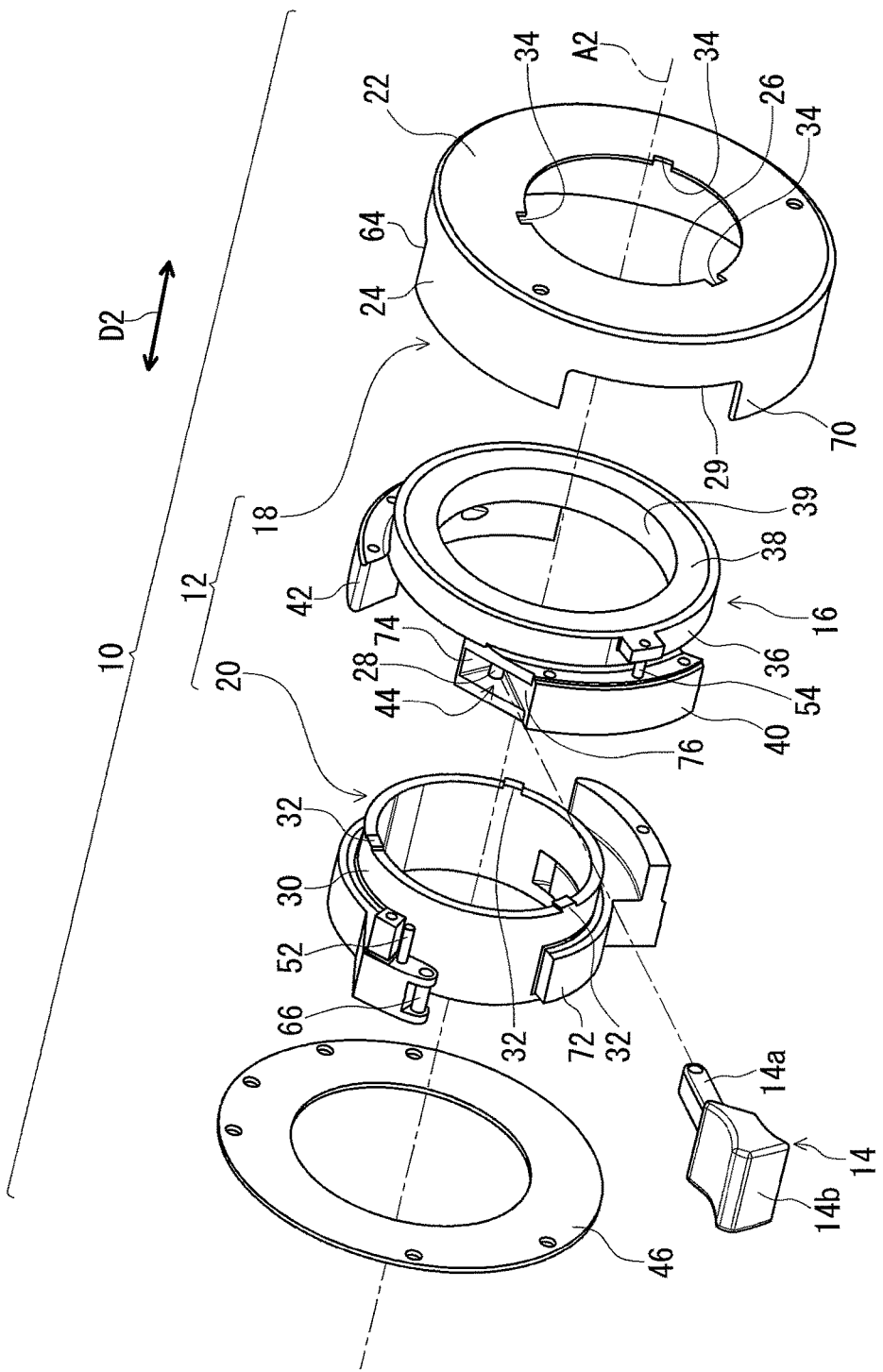
FIG. 6 is an exploded perspective view of the bicycle operating device illustrated in FIG. 1.

As seen in FIG. 6, the support body 20 has a cylindrical portion 30 and protrusions 32. The protrusions 32 protrude from the cylindrical portion 30 in an axial direction D2 parallel to the rotational axis A2. The housing 18 include cutouts 34. The protrusions 32 are fitted to the cutouts 34. Thus, support body 20 is positioned stationary relative to the housing 18 by an engagement of the protrusions 32 and cutouts 34.

The movable member 16 includes an annular body 36, a sliding member 38, a first part 40, and a second part 42. The sliding member 38 has an annular shape and is fitted in the annular body 36. The sliding member 38 includes a slide opening 39 through which the cylindrical portion 30 of the support body 20 extends.

Figure 7:
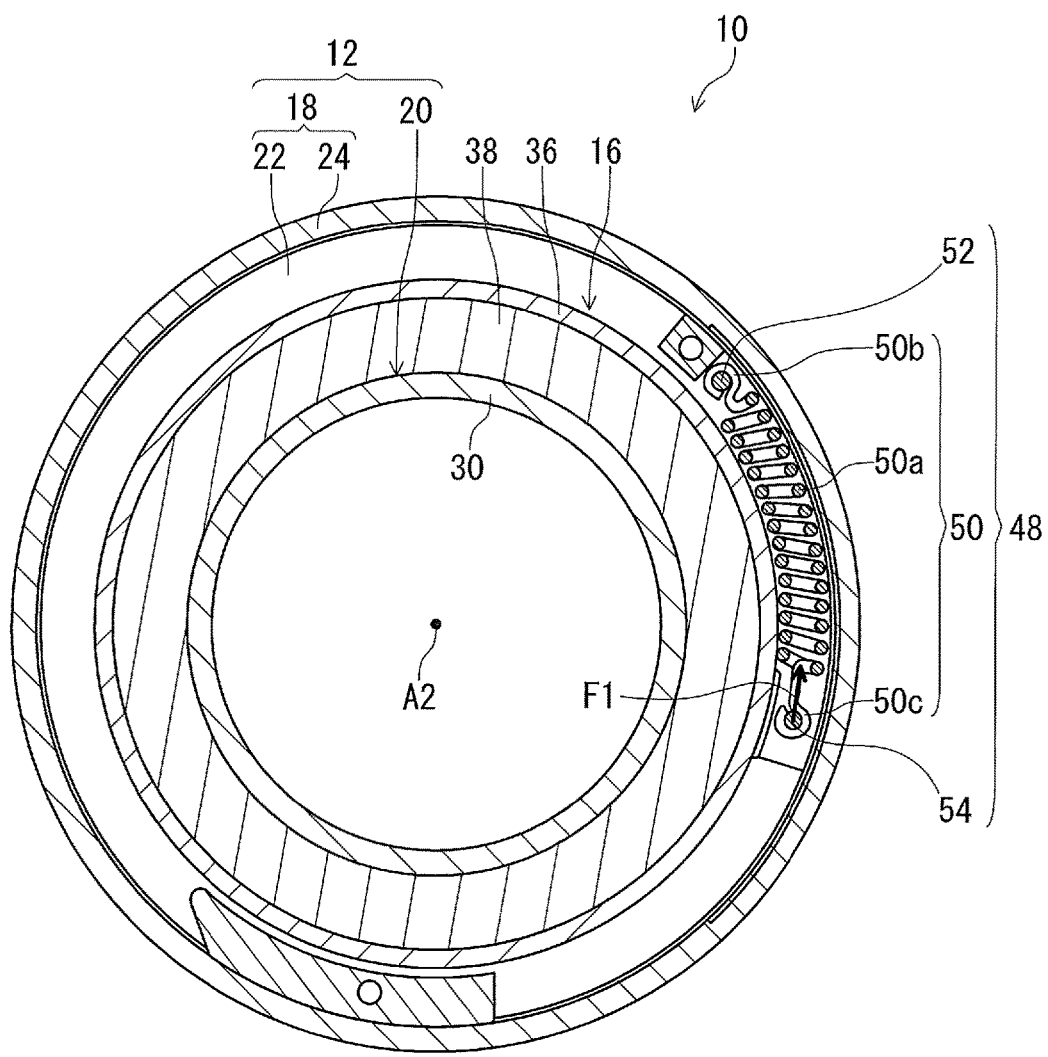
FIG. 7 is a cross-sectional view of the bicycle operating device taken along line VII-VII of FIG. 1 (the rest position)

As seen in FIG. 7, the sliding member 38 is provided radially outward of the cylindrical portion 30 of the support body 20. The sliding member 38 is slidable with an outer peripheral surface of the cylindrical portion 30 so that the movable member 16 is rotatable relative to the base member 12 about the rotational axis A2.

As seen in FIG. 2, the first part 40 and the second part 42 are provided on the annular body 36. In the illustrated embodiment, the first part 40 and the second part 42 are integrally provided with the annular body 36 as a single unitary member. The second part 42 is opposite to the first part 40 relative to the rotational axis A2.

As seen in FIGS. 2 and 6, the operating member 14 is pivotably coupled to the first part 40 via the pivot pin 28. The pivot pin 28 is secured to the first part 40. The first part 40 includes a recess 44. The pivot pin 28 is provided in the recess 44. The pivot end 14a of the operating member 14 is provided in the recess 44. The operating member 14 is pivotable relative to the first part 40 within the recess 44.

The bicycle operating device 10 further includes a cover member 46 having an annular shape. The cover member 46 is secured to the movable member 16 with fasteners such as screws (not shown). The cover member 46 is rotatable together with the movable member 16 relative to the base member 12 about the rotational axis A2. However, the cover member 46 can be omitted from the bicycle operating device 10 if needed and/or desired. Furthermore, the cover member 46 can be secured to the base member 12 if needed and/or desired.

As seen in FIG. 7, the bicycle operating device 10 further comprises a biasing structure 48. As seen in FIGS. 3 to 5 and 7, the biasing structure 48 is configured to bias the movable member 16 relative to the base member 12 so that the operation cable 2 is moved relative to the base member 12 in the releasing direction D12 in response to the release of the operating member 14 from each of the first operated position P1 (FIG. 4) and the second operated position P2 (FIG. 5). In the illustrated embodiment, the biasing structure 48 is configured to apply a biasing force F1 to the movable member 16.

As seen in FIGS. 3 and 4, the biasing structure 48 is configured to bias the movable member 16 from the first pulling position P21 toward the release position P20 to move the operation cable 2 in the releasing direction D12 in response to the release of the operating member 14 from the first operated position P1. As seen in FIGS. 3 and 5, the biasing structure 48 is configured to bias the movable member 16 from the second pulling position P22 toward the release position P20 to move the operation cable 2 in the releasing direction D12 in response to the release of the operating member 14 from the second operated position P2.

In the illustrated embodiment, as seen in FIG. 7, the biasing structure 48 includes a biasing member 50 configured to bias the movable member 16 relative to the base member 12. The biasing member 50 is provided in the base member 12. While the biasing member 50 is a tension coil spring in the illustrated embodiment, the biasing member 50 can be other biasing members such as a compression coil spring and a torsion coil spring.

As seen in FIG. 7, the biasing structure 48 includes a first attachment portion 52 and a second attachment portion 54. As seen in FIGS. 2 and 6, the first attachment portion 52 is secured to the base member 12. The second attachment portion 54 is secured to the movable member 16. As seen in FIG. 7, the biasing member 50 includes a coiled body 50a, a first end portion 50b, and a second end portion 50c. The first end portion 50b is hooked to the first attachment portion 52. The second end portion 50c is hooked to the second attachment portion 54.

While the bicycle operating device 10 comprises the biasing structure 48 in the illustrated embodiment, the biasing structure 48 can be omitted from the bicycle operating device 10 if needed and/or desired. In such an embodiment, the movable member 16 can be pulled by a biasing structure provided in the bicycle component B2 via the operation cable 2.

As seen in FIG. 3, the movable member 16 includes a cable attachment portion 56 to which the inner wire 2b of the operation cable 2 is to be attached. In the illustrated embodiment, the cable attachment portion 56 includes a first recess 57 and a through-hole 58. The through-hole 58 extends from the first recess 57. An end member 2c of the inner wire 2b is provided in the first recess 57. The inner wire 2b of the operation cable 2 extends through the through-hole 58.

The base member 12 includes an outer-casing receiving portion 59 configured to receive the outer casing 2a of the operation cable 2. The outer-casing receiving portion 59 includes a second recess 60 and a guide hole 61. The guide hole 61 extends from the second recess 60. An end of the outer casing 2a is provided in the second recess 60. The inner wire 2b of the operation cable 2 extends through the guide hole 61.

As seen in FIGS. 3 to 5, the base member 12 includes a guide portion 62 configured to guide the operation cable 2 in the pulling direction D11. In the illustrated embodiment, the guide portion 62 is configured to guide the inner wire 2b of the operation cable 2 in the pulling direction D11. The guide portion 62 includes a guide groove 62a. The guide groove 62a is connected to the guide hole 61 of the outer-casing receiving portion 59. The inner wire 2b of the operation cable 2 extends through the guide groove 62a.

Figure 8:
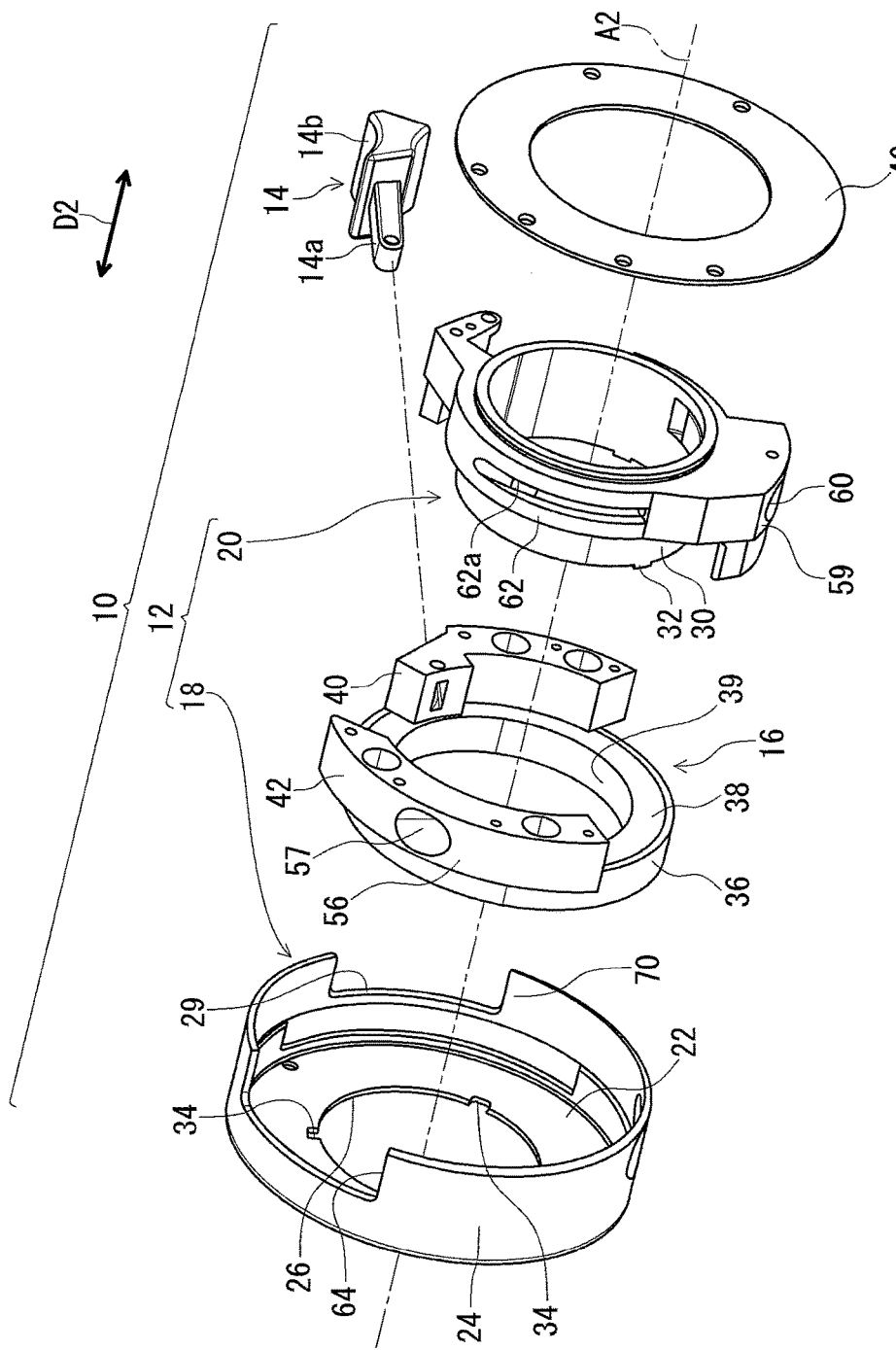
FIG. 8 is an exploded perspective view of the bicycle operating device illustrated in FIG. 1.

As seen in FIG. 8, the guide groove 62a is provided on an outer peripheral surface of the support body 20 of the base member 12. The guide portion 62 can be omitted from the base member 12 or can be provided at other positions if needed and/or desired. The cable attachment portion 56 is provided on the second part 42 of the movable member 16. The cable attachment portion 56 can be provided at other positions if needed and/or desired.

As seen in FIG. 8, the base member 12 includes an additional opening 64 provided on the second housing portion 24. As seen in FIGS. 3 to 5, the additional opening 64 is provided to prevent interference between the base member 12 and the end member 2c of the inner wire 2b. The end member 2c of the inner wire 2b is movable within the additional opening 64.

As seen in FIG. 3, the base member 12 includes a first contact portion 66 contactable with the operating member 14. The operating member 14 is in contact with the first contact portion 66 in a rest state where the operating member 14 is disposed at the rest position P0. As seen in FIG. 4, the operating member 14 is in contact with the first contact portion 66 in a first operated state where the operating member 14 is disposed at the first operated position P1. As seen in FIG. 2, the first contact portion 66 is secured to the support body 20 and has a curved surface. In the illustrated embodiment, the first contact portion 66 includes a rod secured to the support body 20.

As seen in FIG. 5, the base member 12 includes a second contact portion 68 contactable with at least one of the operating member 14 and the movable member 16. The at least one of the operating member 14 and the movable member 16 is in contact with the second contact portion 68 in a second operated state where the operating member 14 is disposed at the second operated position P2.

In the illustrated embodiment, the second contact portion 68 is contactable with the operating member 14 and the movable member 16. The operating member 14 and the movable member 16 are in contact with the second contact portion 68 in the second operated state. The second contact portion 68 includes a third contact portion 70 and a fourth contact portion 72. The third contact portion 70 is contactable with the operating member 14. The fourth contact portion 72 is contactable with the movable member 16. The operating member 14 and the movable member 16 are respectively in contact with the third contact portion 70 and the fourth contact portion 72 in the second operated state.

As seen in FIGS. 2 and 6, the third contact portion 70 is provided at an edge of the opening 29 on the second housing portion 24. The fourth contact portion 72 is provided on the cylindrical portion 30 of the support body 20. One of the third contact portion 70 and the fourth contact portion 72 can be omitted from the second contact portion 68 if needed and/or desired. Namely, only one of the operating member 14 and the movable member 16 can be in contact with the second contact portion 68 if needed and/or desired.

As seen in FIGS. 3 to 5, the operating member 14 is pivotably coupled to the movable member 16 about the pivot axis A1 between a first position P31 and a second position P32. The movable member 16 includes a first positioning portion 74 and a second positioning portion 76. As seen in FIG. 4, the first positioning portion 74 is contactable with the operating member 14 in a state where the operating member 14 is disposed at the first position P31 relative to the base member 12. The contact of the operating member 14 with the first positioning portion 74 prevents a movement of the movable member 16 in the pulling direction D11 over the first pulling position P21. As seen in FIGS. 3 and 5, the second positioning portion 76 is contactable with the operating member 14 in a state where the operating member 14 is disposed at the second position P32 relative to the base member 12. The contact of the operating member 14 with the second positioning portion 76 prevents a movement of the movable member 16 in the pulling direction D11 over the second pulling position P22.

As seen in FIG. 3, the operating member 14 is in contact with the first contact portion 66 and the second positioning portion 76 in the rest state where the operating member 14 is disposed at the rest position P0 relative to the base member 12. As seen in FIG. 4, the operating member 14 is in contact with the first contact portion 66 and the first positioning portion 74 in the first operated state. As seen in FIG. 5, the operating member 14 is in with the second contact portion 68 and the second positioning portion 76 in the second operated state. In the illustrated embodiment, the operating member 14 is in contact with the third contact portion 70 and the second positioning portion 76 in the second operated state. As seen in FIGS. 2 and 6, the first positioning portion 74 and the second positioning portion 76 define the recess 44 of the movable member 16.

Since the biasing force F1 is applied to the movable member 16 by the biasing structure 48 (FIG. 7), the operating member 14 is positioned at the rest position P0 by the first contact portion 66 and the second positioning portion 76 when the operating member 14 is not operated by a user.

As seen in FIGS. 3 and 4, when the operating member 14 is operated by a user from the rest position P0 toward the first operated position P1, the operating member 14 is pivoted relative to the base member 12 about the first contact portion 66 toward the first operated position P1 with contacting the first contact portion 66. This presses the movable member 16 to rotate relative to the base member 12 about the rotational axis A2 from the release position P20 toward the first pulling position P21 against the biasing force F1. At this time, the operating member 14 is pivoted relative to the movable member 16 from the first position P31 toward the second position P32.

As seen in FIG. 4, the contact between the operating member 14 and the first positioning portion 74 stops the pivotal movement of the operating member 14 and the rotation of the movable member 16 at the first pulling position P21. Accordingly, the operation cable 2 is pulled relative to the base member 12 in the pulling direction D11 by the first amount of movement M1. The movable member 16 is positioned at the first pulling position P21 while the operating member 14 is positioned at the first operated position P1 by the user, allowing the first amount of movement M1 to be maintained.

As seen in FIGS. 3 and 4, when the operating member 14 is released by the user from the first operated position P1, the movable member 16 is returned to the release position P20 by the biasing force F1. This allows the operation cable 2 to be released (moved) in the releasing direction D12. The operating member 14 is positioned at the rest position P0 by the first contact portion 66 and the second positioning portion 76. Thus, the movable member 16 is positioned at the release position P20.

As seen in FIGS. 3 and 5, when the operating member 14 is operated by a user from the rest position P0 toward the second operated position P2, the operating member 14 keeps in contact with the second positioning portion 76 of the movable member 16. Thus, the operating member 14 and the movable member 16 are pivoted together relative to the base member 12 about the second axis A2 toward the second operated position P2 and the second pulling position P22 against the biasing force F1.

As seen in FIG. 5, the contact between the second contact portion 68 and each of the operating member 14 and the movable member 16 stops the rotation of the movable member 16 at the second pulling position P22. More specifically, the contacts between the third contact portion 70 and the operating member 14 and between the fourth contact portion 72 and the movable member 16 stop the rotation of the movable member 16 at the second pulling position P22. Accordingly, the operation cable 2 is pulled relative to the base member 12 in the pulling direction D11 by the second amount of movement M2. The movable member 16 is positioned at the second pulling position P22 while the operating member 14 is positioned at the second operated position P2 by the user, allowing the second amount of movement M2 to be maintained.

As seen in FIGS. 3 and 5, when the operating member 14 is released by the user from the second operated position P2, the movable member 16 is returned to the release position P20 by the biasing force F1. This allows the operation cable 2 to be released (moved) in the releasing direction D12. The operating member 14 is positioned at the rest position P0 by the first contact portion 66 and the second positioning portion 76. Thus, the movable member 16 is positioned at the release position P20.

Therefore, in this embodiment, the operating device 10 does not include a positioning structure configured to position the movable member 16 at the first pulling position P21 and the second pulling position P22 relative to the base member 12 in a state where the operating force is not applied from the rider's finger(s) to the operating member 14. In the present application, possible examples of the phrase "release of the operating member" as used herein include moving the rider's finger(s) away from an operating member such as the operating member 14, and removing, from the operating member, an operating force applied from the rider's finger(s) to the operating member. In the embodiment, however, the operating device 10 includes a positioning structure which positions the movable member 16 only at the release position P20 in a state where the operating force is not applied from the rider's finger(s) to the operating member 14.

With the bicycle operating device 10, the rest position P0 is disposed between the first operated position P1 and the second operated position P2. The movable member 16 is configured to move the operation cable 2 in the pulling direction D11 to operate the bicycle component B2 in response to the first movement of the operating member 14 from the rest position P0 to the first operated position P1. The movable member 16 is configured to move the operation cable 2 in the pulling direction D11 to operate the bicycle component B2 in response to the second movement of the operating member 14 from the rest position P0 to the second operated position P2. Accordingly, it is possible to move the operation cable 2 in the pulling direction D11 even if the operating member 14 is operated in different ways.

Furthermore, the movable member 16 is configured such that the operation cable 2 is movable in the releasing direction D12 in response to the release of the operating member 14 from the first operated position P1. The movable member 16 is configured such that the operation cable 2 is movable in the releasing direction D12 in response to the release of the operating member 14 from the second operated position P2. Accordingly, it is possible to return the operation cable 2 to an initial position by releasing the operating member 14, allowing the structure of the bicycle operating device 10 to be simplified.

The bicycle operating device 10 can be used to operate several bicycle components. One example of the bicycle component B2 will be described below referring to FIGS. 9 to 16.

Figure 9:
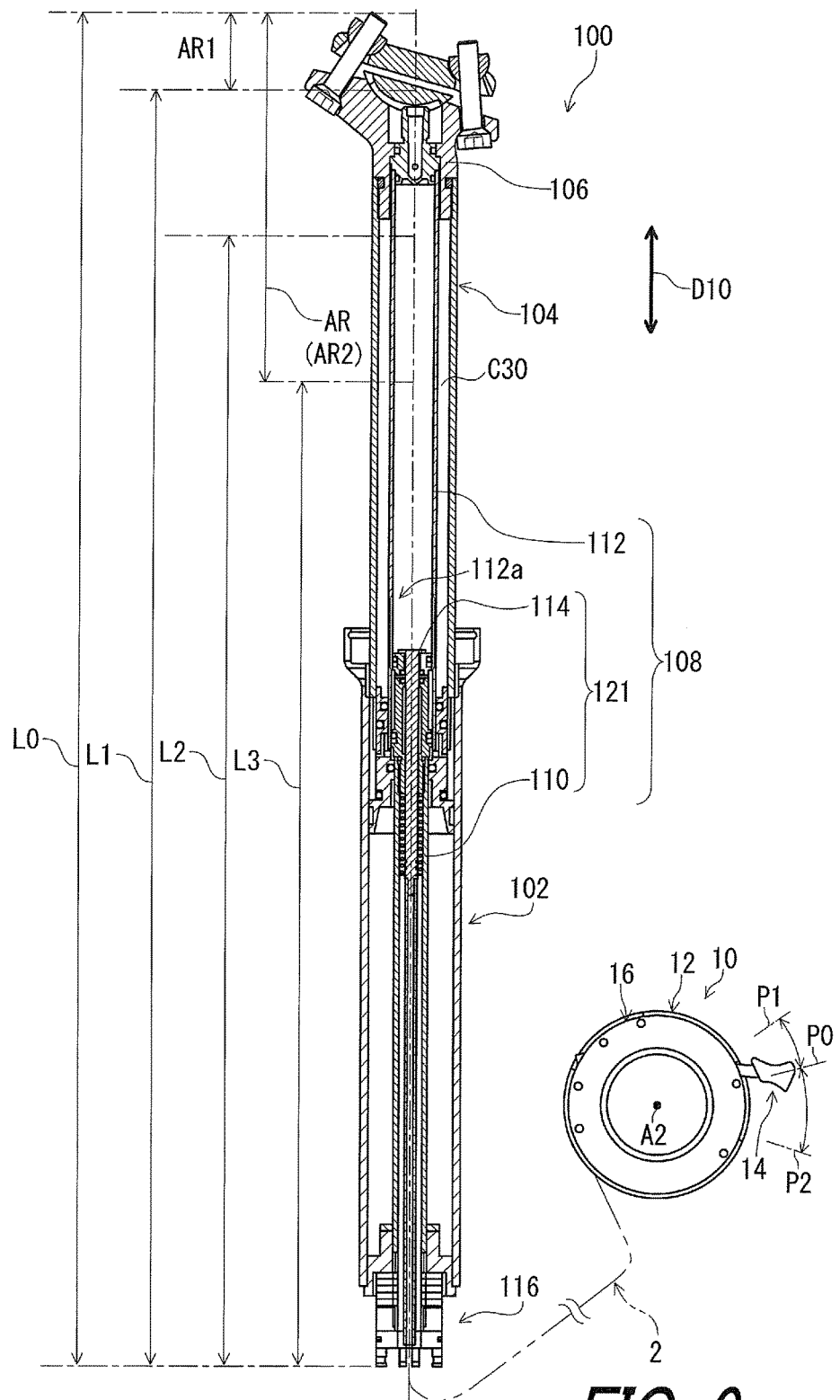
FIG. 9 is a cross-sectional view of a bicycle seatpost assembly in accordance with the first embodiment.

As seen in FIG. 9, the bicycle operating device 10 can be used to operate a bicycle seatpost assembly 100 via the operation cable 2, for example. The operation cable 2 is configured to be connected to the bicycle seatpost assembly 100 to adjust an overall length of the bicycle seatpost assembly 100. The bicycle seatpost assembly 100 has a maximum overall length L0 and a minimum overall length L3. The overall length of the bicycle seatpost assembly 100 is adjustable within an adjustable range AR defined as a difference between the maximum overall length L0 and the minimum overall length L3. The bicycle seatpost assembly 100 has a first overall length L1 and a second overall length L2. The first overall length L1 and the second overall length L2 are defined between the maximum overall length L0 and the minimum overall length L3. The first and second overall lengths L1 and L2 are different from each other.

For example, the overall length of the bicycle seatpost assembly 100 is adjustable to the first overall length L1 in a state where the operating member 14 is positioned at the first operated position P1 such that the operation cable 2 is pulled relative to the base member 12 by the first amount of movement M1 (FIG. 4). The overall length of the bicycle seatpost assembly 100 is adjustable to the second overall length L2 in a state where the operating member 14 is positioned at the second operated position P2 such that the operation cable 2 is pulled relative to the base member 12 by the second amount of movement M2 (FIG. 5).

As seen in FIG. 9, the bicycle seatpost assembly 100 comprises a first cylinder 102 and a second cylinder 104. The first cylinder 102 is detachably attached to a seat tube (not shown), for example. However, the second cylinder 104 can be detachably attached to the seat tube if needed and/or desired. The second cylinder 104 is configured to be telescopically received in the first cylinder 102. The first cylinder 102 and the second cylinder 104 are configured to be movable relative to each other in a telescopic direction D10. The second cylinder 104 includes a saddle attachment portion 106 to which a saddle (not shown) is to be attached.

In the illustrated embodiment, the bicycle seatpost assembly 100 has a locked state, a first adjustable state and a second adjustable state. The bicycle seatpost assembly 100 has a structure configured to switch a state of the bicycle seatpost assembly 100 among the locked state, the first adjustable state and the second adjustable state using the bicycle operating device 10.

For example, in the locked state, the overall length of the bicycle seatpost assembly 100 is maintained at an adjusted overall length. In the locked state, the first cylinder 102 and the second cylinder 104 are fixedly positioned relative to each other in the telescopic direction D10.

In the first adjustable state, the overall length of the bicycle seatpost assembly 100 is adjustable to the first overall length L1 by just operating the operating member 14 of the bicycle operating device 10 to the first operated position P1. More specifically, in the first adjustable state, the second cylinder 104 stops relative to the first cylinder 102 at a position corresponding to the first overall length L1 when the second cylinder 104 downwardly moves relative to the first cylinder 102 from a position corresponding to the maximum overall length L0. In the first adjustable state, the first cylinder 102 and the second cylinder 104 are telescopically movable relative to each other between the maximum overall length L0 and the first overall length L1 in the telescopic direction D10.

Furthermore, in the first adjustable state, the overall length of the bicycle seatpost assembly 100 is continuously adjustable between the maximum overall length L0 and the first overall length L1 by operating the operating member 14 of the bicycle operating device 10 to the first operated position P1. In the second adjustable state, the first cylinder 102 and the second cylinder 104 are telescopically movable relative to each other between the maximum overall length L0 and the minimum overall length L3 in the telescopic direction D10. Namely, in the first adjustable state, a positional relationship between the first cylinder 102 and the second cylinder 104 is continuously adjustable within a first adjustable position range AR1. The first adjustable position range AR1 is defined between a first maximum overall length (the maximum overall length L0) and a first minimum overall length (the first overall length L1) of the bicycle seatpost assembly 100.

In the second adjustable state, the overall length of the bicycle seatpost assembly 100 is continuously adjustable within the adjustable range AR by operating the operating member 14 to the second operated position P2. Namely, in the second adjustable state, the positional relationship between the first cylinder 102 and the second cylinder 104 is continuously adjustable within a second adjustable position range AR2 (the adjustable range AR) different from the first adjustable position range AR1. The second adjustable position range AR2 is defined between a second maximum overall length (the maximum overall length L0) and a second minimum overall length (the minimum overall length L3) of the bicycle seatpost assembly 100. In the illustrated embodiment, the second overall length L2 shows possible overall lengths within the adjustable range AR while the first overall length L1 is a predetermined overall length.

As seen in FIG. 9, the first adjustable position range AR1 and the second adjustable position range AR2 are different from each other. More specifically, the first adjustable position range AR1 at least partially overlaps with the second adjustable position range AR2. In the illustrated embodiment, the first adjustable position range AR1 entirely overlaps with the second adjustable position range AR2 and is included in the second adjustable position range AR2. The second adjustable position range AR2 partially overlaps with the first adjustable position range AR1.

The first adjustable position range AR1 has a total length different from a total length of the second adjustable position range AR2. In the illustrated embodiment, the total length of the first adjustable position range AR1 is shorter than the total length of the second adjustable position range AR2. The first minimum overall length (first overall length L1) is different from the second minimum overall length (the minimum overall length L3). On the other hand, the first maximum overall length (the maximum overall length L0) is equal to the second maximum overall length (the maximum overall length L0). In the illustrated embodiment, the first minimum overall length (first overall length L1) is longer than the second minimum overall length (the minimum overall length L3).

As seen in FIG. 9, the bicycle seatpost assembly 100 comprises a positioning structure 108. The positioning structure 108 is configured to relatively position the first cylinder 102 and the second cylinder 104. The positioning structure 108 is configured to switch a state of the bicycle seatpost assembly 100 among the locked state, the first adjustable state and the second adjustable state.

The positioning structure 108 is configured to switch the state of the bicycle seatpost assembly 100 among the first adjustable state and the second adjustable state in response to an operation of the bicycle operating device 10 (FIG. 4). The positioning structure 108 is configured to switch the state of the bicycle seatpost assembly 100 to the first adjustable state in response to a first operation of the bicycle operating device 10. The positioning structure 108 is configured to switch the state of the bicycle seatpost assembly 100 to the second adjustable state in response to a second operation of the bicycle operating device 10.

In the illustrated embodiment, as seen in FIG. 4, the first operation of the bicycle operating device 10 is an operation in which the operating member 14 is moved relative to the base member 12 from the rest position P0 to the first operated position P1. As seen in FIG. 5, the second operation of the bicycle operating device 10 is an operation in which the operating member 14 is moved relative to the base member 12 from the rest position P0 to the second operated position P2.

As seen in FIG. 9, the positioning structure 108 includes a support member 110 and a fluid cylinder 112. The support member 110 is configured to be telescopically movable relative to the fluid cylinder 112. The support member 110 and the fluid cylinder 112 extend in the telescopic direction D10. The support member 110 is provided in the first cylinder 102 and is integrally movable with the first cylinder 102 relative to the second cylinder 104. The fluid cylinder 112 is provided in the second cylinder 104 and is integrally movable with the second cylinder 104 relative to the first cylinder 102. However, the support member 110 can be provided in the second cylinder 104 and the fluid cylinder 112 can be provided in the first cylinder 102 if needed and/or desired.

Figure 10:
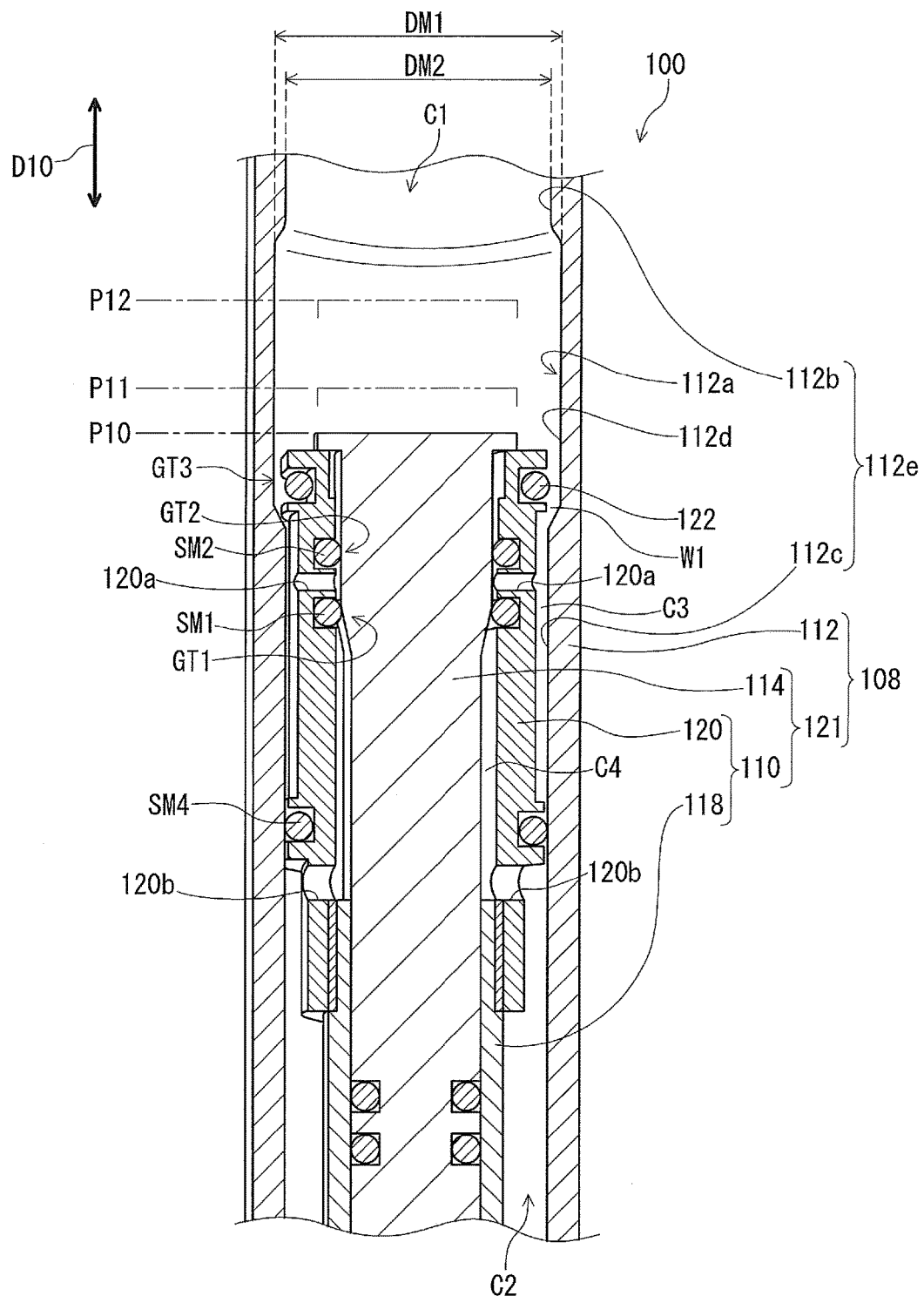
FIG. 10 is a partial cross-sectional view of the bicycle seatpost assembly illustrated in FIG. 9 (a closed position)

As seen in FIG. 10, the positioning structure 108 includes a valve member 114. The valve member 114 is configured to be movable relative to the support member 110. As seen in FIG. 9, the bicycle seatpost assembly 100 further includes a valve operating structure 116 attached to a lower end of the first cylinder 102. The valve operating structure 116 is operatively connected to the bicycle operating device 10 via the operation cable 2. The valve member 114 is upwardly moved relative to the support member 110 via the valve operating structure 116. In the illustrated embodiment, the valve member 114 is upwardly moved relative to the support member 110 via the valve operating structure 116 in response to the first operation and the second operation of the bicycle operating device 10 (FIG. 9).

As seen in FIG. 10, the support member 110 includes an inner tube 118 and a valve receiving member 120. The valve receiving member 120 is secured to an upper end of the inner tube 118 and is slidably provided in the fluid cylinder 112. The positioning structure 108 is configured to change a position of the valve member 114 relative to the support member 110 in response to an operation of the bicycle operating device 10 (FIG. 9).

As seen in FIG. 10, the positioning structure 108 includes a first chamber C1 and a second chamber C2. The first chamber C1 is defined by the support member 110 (the valve receiving member 120), the fluid cylinder 112 and the valve member 114. The second chamber C2 is defined by the support member 110 and the fluid cylinder 112. Each of the first chamber C1 and the second chamber C2 is filled with a substantially incompressible fluid (e.g., oil), for example.

Figure 12:
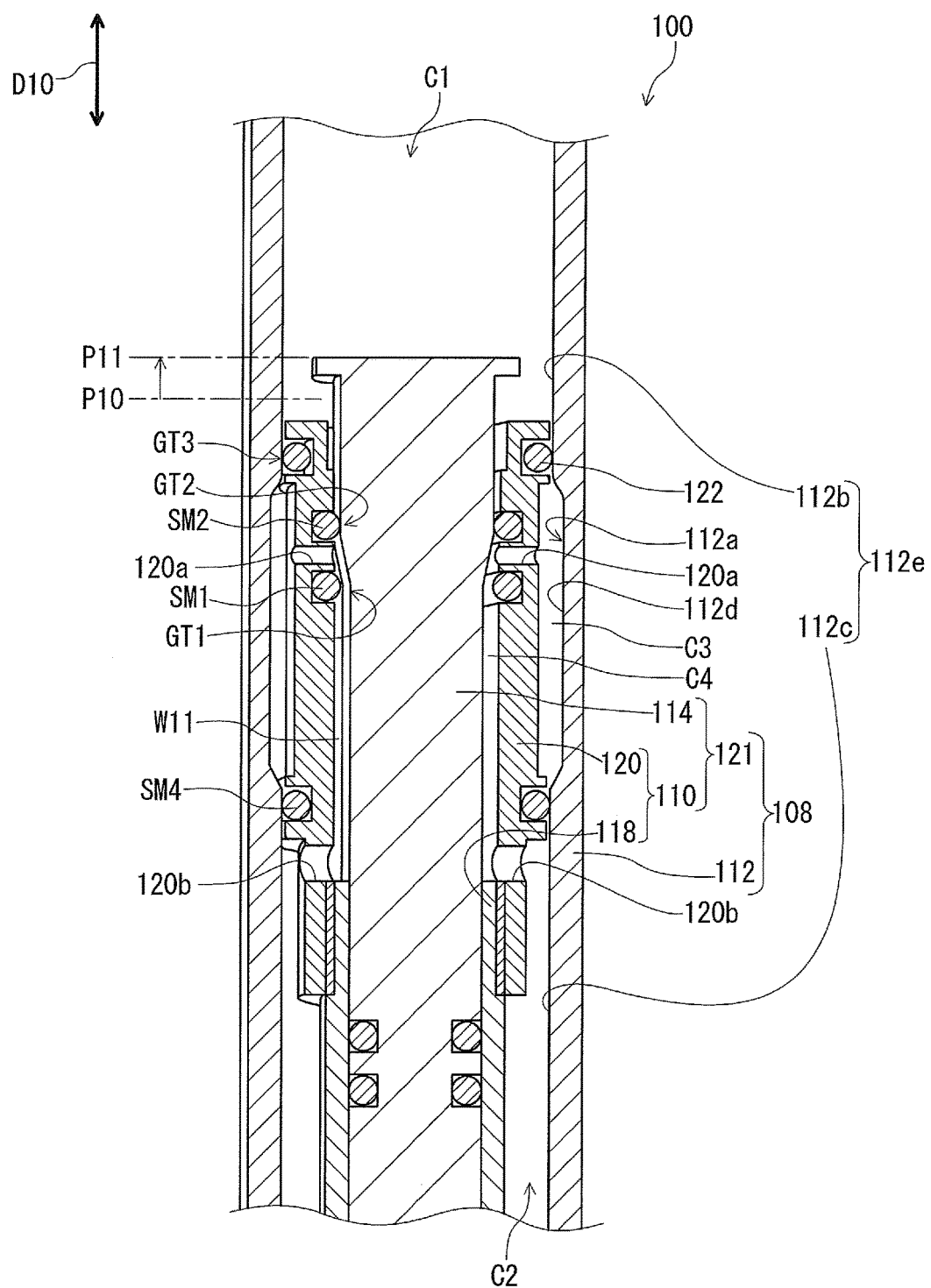
FIG. 12 is a partial cross-sectional view of the bicycle seatpost assembly illustrated in FIG. 9 (the first open position)
Figure 13:
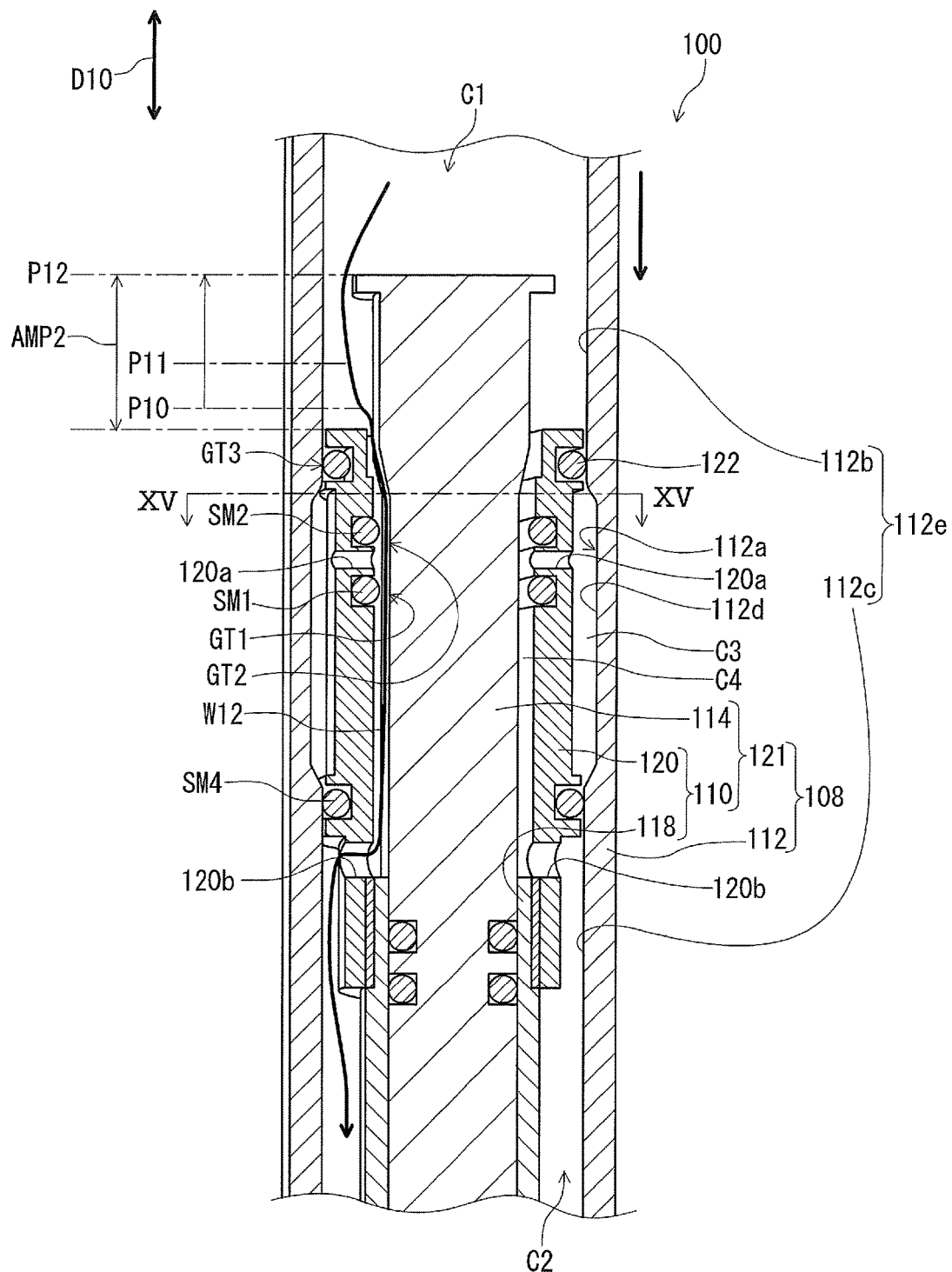
FIG. 13 is a partial cross-sectional view of the bicycle seatpost assembly illustrated in FIG. 9 (a second open position)

The support member 110 and the valve member 114 constitute a valve structure 121. The valve structure 121 has a closed state (FIG. 10), a first open state (FIGS. 11 and 12) and a second open state (FIG. 13). The closed state corresponds to the locked state of the bicycle seatpost assembly 100. The first open state corresponds to the first adjustable state of the bicycle seatpost assembly 100. The second open state corresponds to the second adjustable state of the bicycle seatpost assembly 100.

As seen in FIG. 10, the valve member 114 is slidably provided in the inner tube 118 and the valve receiving member 120. The valve member 114 is configured to be positioned at a closed position P10, a first open position P11 and a second open position P12. In the closed state of the valve structure 121, the valve member 114 is positioned at the closed position P10. In the first open state of the valve structure 121, the valve member 114 is positioned at the first open position P11. In the second open state of the valve structure 121, the valve member 114 is positioned at the second open position P12. The positioning structure 108 includes a biasing element (not shown) configured to bias the valve member 114 relative to the support member 110 toward the closed position P10.

The valve member 114 contacts the valve receiving member 120 to close the valve structure 121 in a state where the valve member 114 is positioned at the closed position P10. The closed position P10 corresponds to the rest position P0 (FIGS. 3 and 9) of the bicycle operating device 10. The first open position P11 corresponds to the first operated position P1 (FIGS. 4 and 9) of the bicycle operating device 10. The second open position P12 corresponds to the second operated position P2 (FIGS. 5 and 9) of the bicycle operating device 10. The position of the valve member 114 is continuously adjustable relative to the support member 110 between the closed position P10 and the second open position P12 using the bicycle operating device 10 (FIG. 9). The position of the valve member 114 can be adjusted at the first open position P11 relative to the support member 110 using the first operated position P1 of the bicycle operating device 10 (FIG. 9).

Figure 11:
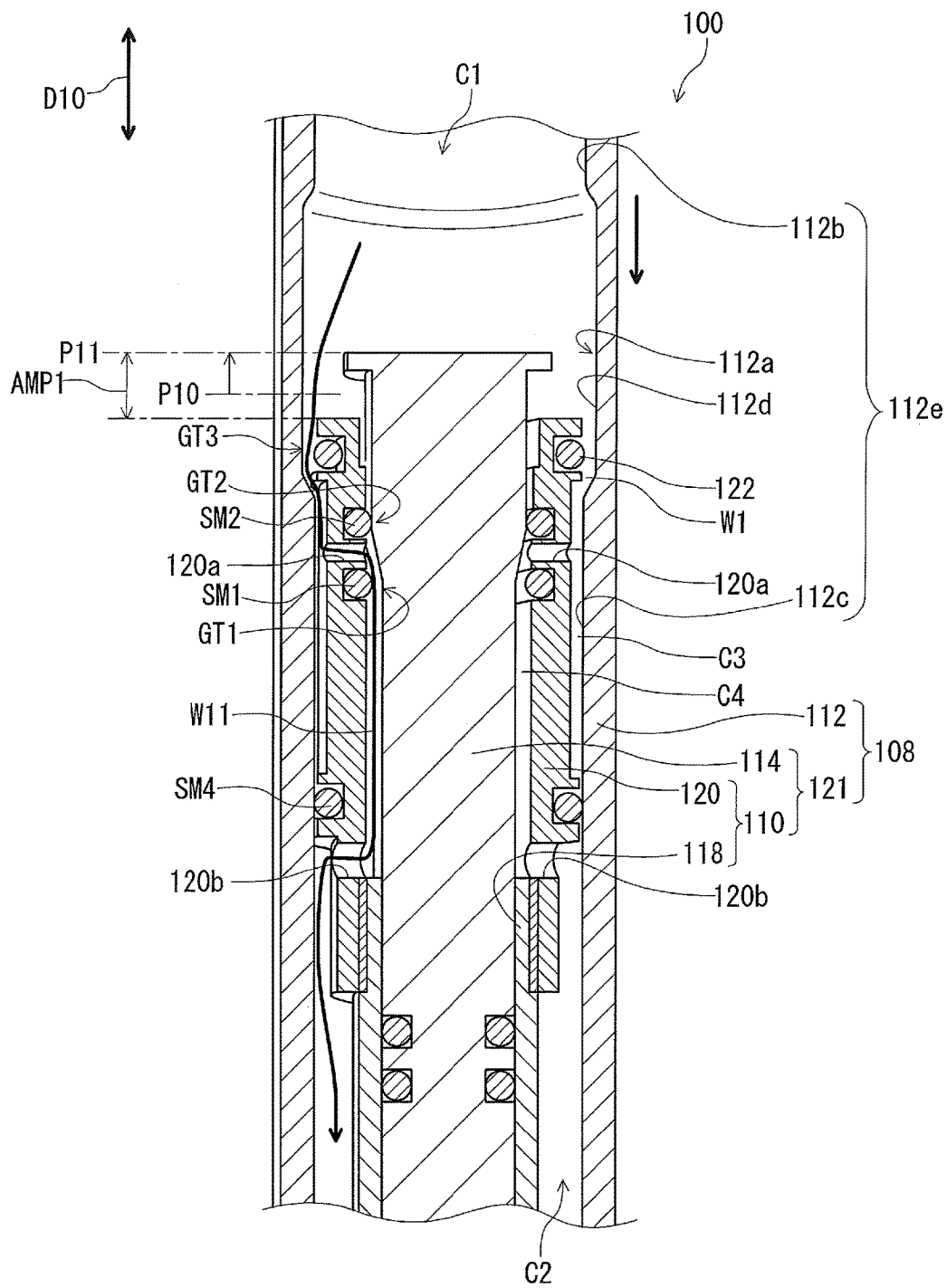
FIG. 11 is a partial cross-sectional view of the bicycle seatpost assembly illustrated in FIG. 9 (a first open position)
Figure 14:
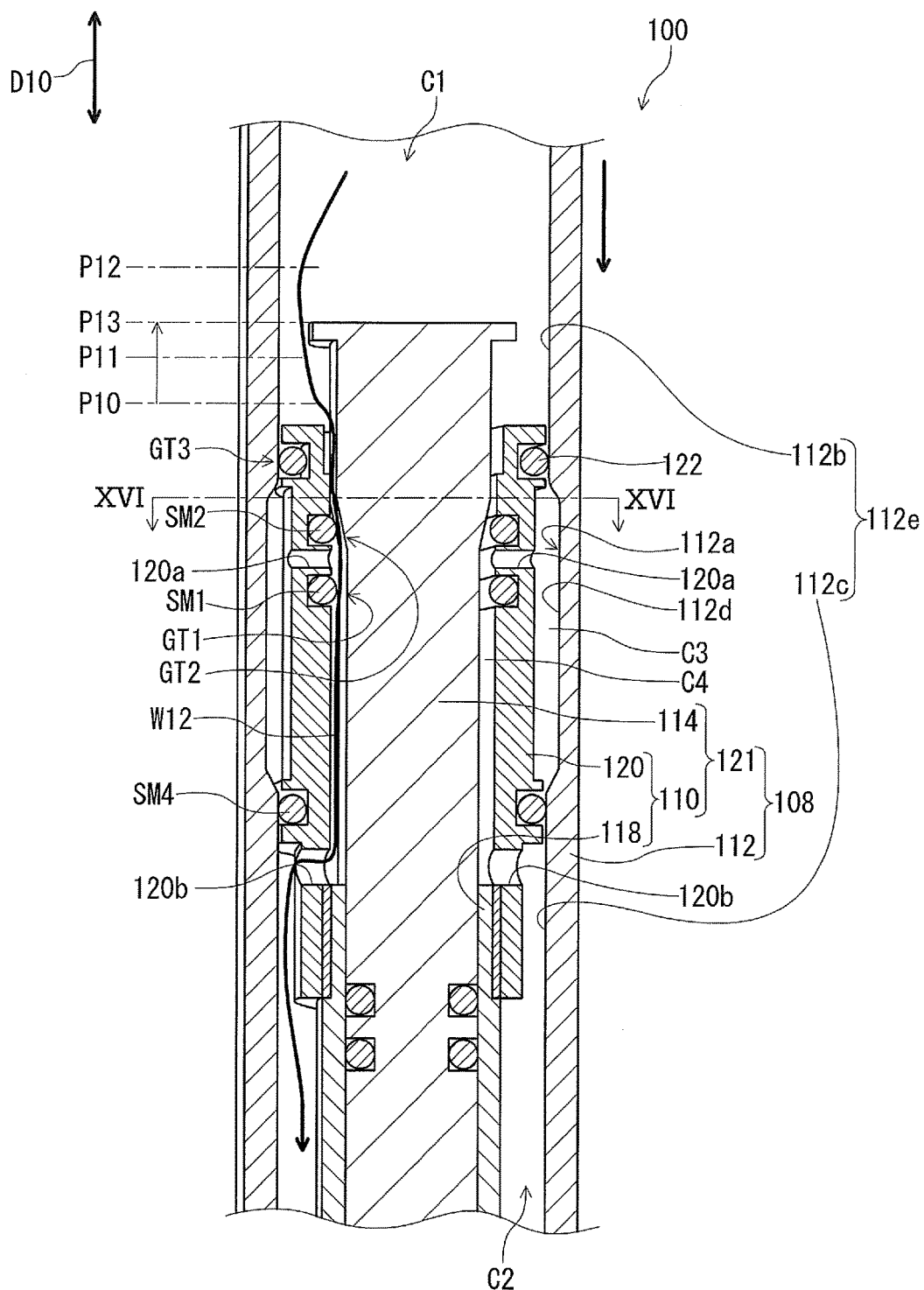
FIG. 14 is a partial cross-sectional view of the bicycle seatpost assembly illustrated in FIG. 9 (a third open position)

As seen in FIGS. 11 and 13, the valve member 114 is movably mounted to the support member 110 and is configured to protrude from the support member 110. As seen in FIG. 11, the valve member 114 protrudes from the support member 110 by a first amount of protrusion AMP1 in a state where the valve member 114 is disposed at the first open position P11. As seen in FIG. 13, the valve member 114 protrudes from the support member 110 by a second amount of protrusion AMP2 different from the first amount of protrusion AMP1 in a state where the valve member 114 is disposed at the second open position P12. In the illustrated embodiment, as seen in FIGS. 12 and 14, the second amount of protrusion AMP2 is greater than the first amount of protrusion AMP1.

As seen in FIGS. 11 and 13, the positioning structure 108 includes a first passageway W11 and a second passageway W12. As seen in FIG. 11, the first chamber C1 is in communication with the second chamber C2 via the first passageway W11 in the first adjustable state of the bicycle seatpost assembly (i.e., in a state where the valve member 114 is disposed at the first open position P11). As seen in FIG. 13, the first chamber C1 is in communication with the second chamber C2 via the second passageway W12 in the second adjustable state of the bicycle seatpost assembly (i.e., in a state where the valve member 114 is disposed at the second open position P12). As seen in FIGS. 11 and 13, the first passageway W11 and the second passageway W12 are at least partially disposed between the support member 110 and the valve member 114. In the illustrated embodiment, the first passageway W11 is at least partially different from the second passageway W12.

As seen in FIGS. 11 and 13, the positioning structure 108 is configured to switch a fluid passageway among the first passageway W11 and the second passageway W12 to switch the state of the bicycle seatpost assembly among the first adjustable state and the second adjustable state. In the illustrated embodiment, the valve member 114 is configured to switch the fluid passageway among the first passageway W11 and the second passageway W12 in accordance with the position of the valve member 114 relative to the support member 110.

As seen in FIG. 11, the first passageway W11 includes a first gate GT1 configured to open and close in response to the position of the valve member 114 relative to the support member 110. The first gate GT1 is open in a state where the valve member 114 is disposed at the first open position P11.

More specifically, the positioning structure 108 includes a first-gate seal member SM1 provided on an inner periphery of the valve receiving member 120. The first-gate seal member SM1 is contactable with the valve member 114. The first gate GT1 is closed in a state where the first-gate seal member SM1 contacts the valve member 114 (FIG. 10). The first gate GT1 is open in a state where the first-gate seal member SM1 is spaced apart from the valve member 114 (FIG. 11).

As seen in FIG. 13, the second passageway W12 includes a second gate GT2 configured to open and close in response to a position of the valve member 114 relative to the support member 110. The second gate GT2 is provided at a position different from a position of the first gate GT1. Specifically, the second gate GT2 is provided at a position spaced apart from the first gate GT1 in the telescopic direction D10 and is closer to an upper end of the movable member than the first gate GT1. The first gate GT1 and the second gate GT2 are open in a state where the valve member 114 is disposed at the second open position P12 different from the first open position P11 relative to the support member 110.

More specifically, the positioning structure 108 includes a second-gate seal member SM2 provided on the inner periphery of the valve receiving member 120. The second-gate seal member SM2 is contactable with the valve member 114. The second gate GT2 is closed in a state where the second-gate seal member SM2 contacts the valve member 114 (FIG. 10). The second gate GT2 is open in a state where the second-gate seal member SM2 is spaced apart from the valve member 114 (FIG. 13).

As seen in FIG. 10, the first gate GT1 and the second gate GT2 are closed in a state where the valve member 114 is disposed at the closed position P10 different from the first open position P11 and the second open position P12 relative to the support member 110. In this state, the first-gate seal member SM1 and the second-gate seal member SM2 contact the valve member 114 so that the first gate GT1 and the second gate GT2 are closed. As seen in FIG. 11, the second gate GT2 is closed in a state where the valve member 114 is disposed at the first open position P11. In this state, the first-gate seal member SM1 is spaced apart from the valve member 114 so that the first gate GT1 is open, and the second-gate seal member SM2 contacts the valve member 114 so that the second gate GT2 is closed.

A first intermediate chamber C3 is defined between the fluid cylinder 112 and the valve receiving member 120. More specifically, the positioning structure 108 includes an additional seal member SM4 provided on the outer periphery of the valve receiving member 120. The first intermediate chamber C3 is defined by the fluid cylinder 112, the valve receiving member 120 and the additional seal member SM4.

A second intermediate chamber C4 is defined between the valve member 114 and the valve receiving member 120. The valve receiving member 120 includes first through-holes 120a and second through-holes 120b. The first through-holes 120a extends in a radial direction of the valve receiving member 120 and are provided between the first-gate seal member SM1 and the second-gate seal member SM2.

As seen in FIG. 11, the first intermediate chamber C3 is in communication with the second intermediate chamber C4 via the first through-holes 120a in a state where the first gate GT1 is open. The second through-holes 120b extends in the radial direction of the valve receiving member 120 and are provided on an opposite side of the first through-holes 120a relative to the first-gate seal member SM1. The second intermediate chamber C4 is in communication with the second chamber C2 via the second through-holes 120b. The additional seal member SM4 is provided between the first through-holes 120a and the second through-holes 120b in the telescopic direction D10.

As seen in FIG. 14, the first gate GT1 and the second gate GT2 are open in a state where the valve member 114 is disposed at a third open position P13 different from the first open position P11 and the second open position P12 relative to the support member 110. In the illustrated embodiment, the third open position P13 is disposed between the first open position P11 and the second open position P12.

Figure 15:
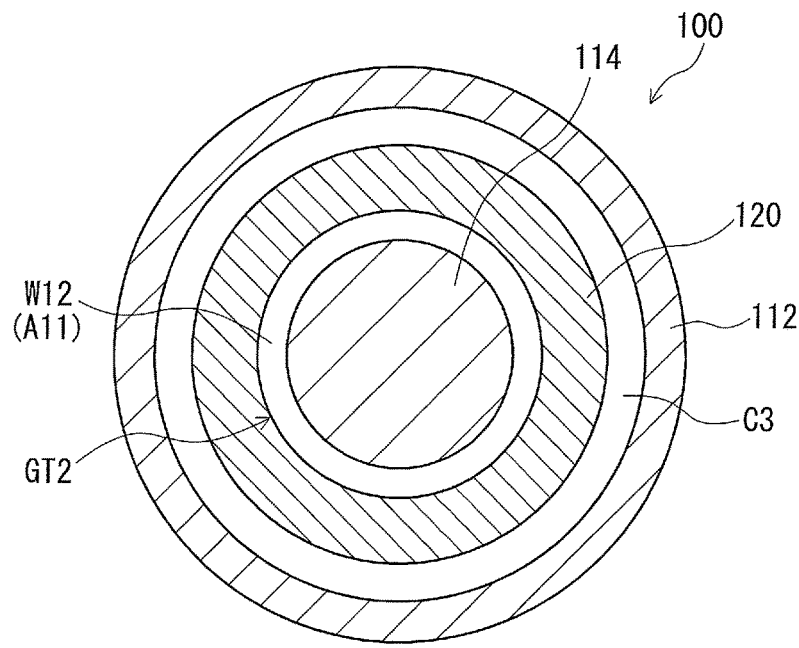
FIG. 15 is a cross-sectional view of the bicycle seatpost assembly taken along line XV-XV of FIG. 13 (the second open position)
Figure 16:
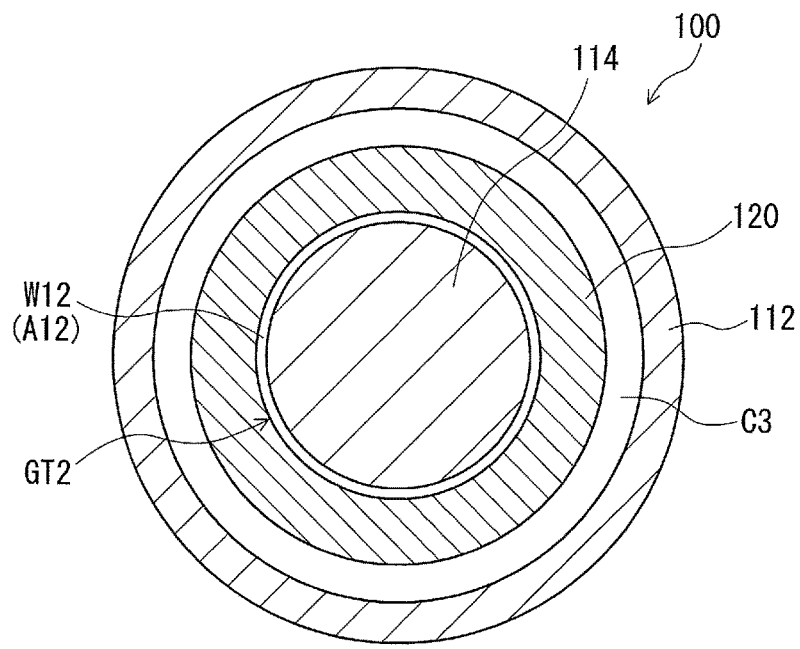
FIG. 16 is a cross-sectional view of the bicycle seatpost assembly taken along line XVI-XVI of FIG. 14 (the third open position)

As seen in FIG. 15, the second gate GT2 has a first cross-sectional area A11 in a state where the valve member 114 is disposed at the second open position P12. The first cross-sectional area A11 is defined on a cross section taken along line XV-XV of FIG. 13. As seen in FIG. 16, the second gate GT2 has a second cross-sectional area A12 in a state where the valve member 114 is disposed at the third open position P13. The second cross-sectional area A12 is defined on a cross section taken along line XVI-XVI of FIG. 14. As seen in FIGS. 15 and 16, the second cross-sectional area A12 is smaller than the first cross-sectional area A11. Since the second cross-sectional area A12 is smaller than the first cross-sectional area A11, fluid resistance caused by the second gate GT2 having the second cross-sectional area A12 is greater than fluid resistance caused by the second gate GT2 having the first cross-sectional area A11. Thus, the second cross-sectional area A12 of the second gate GT2 reduces the relative movement speed between the first cylinder 102 and the second cylinder 104 compared with the first cross-sectional area A11 of the second gate GT2. This allows the user to finely adjust the overall length of the bicycle seatpost assembly 100.

As seen in FIG. 10, the fluid cylinder 112 includes an inner peripheral surface 112e and a recessed inner peripheral surface 112d recessed from the inner peripheral surface 112e. The recessed inner peripheral surface 112d defines an inner diameter DM1 larger than an inner diameter DM2 defined by the inner peripheral surface 112e. The inner peripheral surface 112e includes a first inner peripheral surface 112b and a second inner peripheral surface 112c. The recessed inner peripheral surface 112d is disposed between the first inner peripheral surface 112b and the second inner peripheral surface 112c. The recessed inner peripheral surface 112d defines a recess 112a.

As seen in FIG. 11, the first passageway W11 includes a third gate GT3 configured to open and close in response to a relative position between the support member 110 and the recessed inner peripheral surface 112d. The third gate GT3 is configured to open and close the first passageway W11 provided between the first chamber C1 and the first intermediate chamber C3. The support member 110 includes a seal member 122 (a third-gate seal member) provided on an outer periphery of the support member 110. The third gate GT3 is open in a state where the seal member 122 faces the recessed inner peripheral surface 112d of the fluid cylinder 112 in the radial direction of the valve receiving member 120. More specifically, the third gate GT3 is open in a state where a space is made between the seal member 122 and the recessed inner peripheral surface 112d. The first chamber C1 is in communication with the first intermediate chamber C3 in a state where the third gate GT3 is open (i.e., in a state where the seal member 122 is disposed between an upper end and a lower end of the recessed inner peripheral surface 112d). As seen in FIG. 12, the third gate GT3 is closed in a state where the seal member 122 contacts the inner peripheral surface 112e of the fluid cylinder 112.

The operation of the bicycle seatpost assembly 100 will be described in detail below. As seen in FIG. 10, in a state where the overall length of the bicycle seatpost assembly 100 is the maximum overall length L0, the seal member 122 is disposed radially inward of the recess 112a provided in the fluid cylinder 112. The seal member 122 is spaced apart from the recessed inner peripheral surface 112d of the fluid cylinder 112 to provide a passageway W1 between the recessed inner peripheral surface 112d and the seal member 122. The passageway W1 is a part of the first passageway W11.

As seen in FIG. 11, when the operating member 14 (FIG. 9) of the bicycle operating device 10 is moved by the user from the rest position P0 to the first operated position P1, the valve member 114 is moved from the closed position P10 to the first open position P11. In a state where the valve member 114 is positioned at the first open position P11, the first chamber C1 is in communication with the second chamber C2 via the first intermediate chamber C3, the first through-holes 120a, the second intermediate chamber C4 and the second through-holes 120b. This allows the substantially incompressible fluid to flow from the first chamber C1 to the second chamber C2 via the first passageway W11, allowing the second cylinder 104 to be downwardly moved relative to the first cylinder 102 using the rider's weight applied to the saddle attachment portion 106.

As seen in FIG. 12, after the seal member 122 passes through the recess 112a, the seal member 122 contacts the first inner peripheral surface 112b of the fluid cylinder 112. The third gate GT3 is closed in a state where the seal member 122 contacts the inner peripheral surface 112e of the fluid cylinder 112. This prevents the substantially incompressible fluid from flowing from the first chamber C1 to the second chamber C2, causing the second cylinder 104 to stop moving downwardly relative to the first cylinder 102 and to be fixedly positioned relative to the first cylinder 102 at a position corresponding to the first overall length L1 (FIG. 9) after the valve member 114 moves from the first open position P11 to the closed position P10. Accordingly, when the operating member 14 of the bicycle operating device 10 is moved to the first operated position P1, the second cylinder 104 can downwardly move relative to the first cylinder 102 from the maximum overall length L0 to the first overall length L1 defined by the recess 112a.

As seen FIG. 13, when the operating member 14 is moved by the user from the rest position P0 to the second operated position P2, the valve member 114 is moved from the closed position P10 to the second open position P12. In a state where the valve member 114 is positioned at the second open position P12, the first chamber C1 is in communication with the second chamber C2 via the second intermediate chamber C4 and the second through-holes 120b. This allows the substantially incompressible fluid to flow from the first chamber C1 to the second chamber C2 via the second passageway W12, allowing the second cylinder 104 to be downwardly moved relative to the first cylinder 102 using the rider's weight applied to the saddle attachment portion 106.

At this time, the substantially incompressible fluid flows from the first chamber C1 to the second chamber C2 without via the first intermediate chamber C3. Accordingly, a relative position between the first cylinder 102 and the second cylinder 104 can be continuously adjusted using the bicycle operating device 10 regardless of the recess 112a.

With the bicycle seatpost assembly 100, as seen in FIG. 9, the positioning structure 108 is configured to switch the state of the bicycle seatpost assembly 100 among the first adjustable state and the second adjustable state. In the first adjustable state, the positional relationship between the first cylinder 102 and the second cylinder 104 is continuously adjustable within the first adjustable position range AR1. In the second adjustable state, the positional relationship between the first cylinder 102 and the second cylinder 104 is continuously adjustable within the second adjustable position range AR2 different from the first adjustable position range AR1. Accordingly, it is possible to easily adjust a height of the bicycle seat (not shown) using the first adjustable position range AR1 and the second adjustable position range AR2 which are different from each other. For example, it is possible to easily and/or precisely adjust the overall length of the bicycle seatpost assembly 100 from the maximum overall length L0 to the predetermined first overall length L1 using the first adjustable state.

The bicycle component B2 operated using the bicycle operating device 10 is not limited to the bicycle seatpost assembly 100. The bicycle operating device 10 can be used to operate bicycle components other than the bicycle seatpost assembly 100 if needed and/or desired.

The bicycle seatpost assembly 100 is not limited to a hydraulic adjustable seatpost such that an overall length thereof is continuously adjustable. In a case where the bicycle operating device 10 is applied to a seatpost assembly, the seatpost assembly can include a mechanical structure such that an overall length thereof is mechanically adjustable to a plurality of predetermined different lengths instead of a hydraulic mechanism.

Second Embodiment

A bicycle operating device 210 in accordance with a second embodiment will be described below referring to FIGS. 17 and 26. Elements having substantially the same function as those in the first embodiment will be numbered the same here, and will not be described and/or illustrated again in detail here for the sake of brevity.

Figure 17:
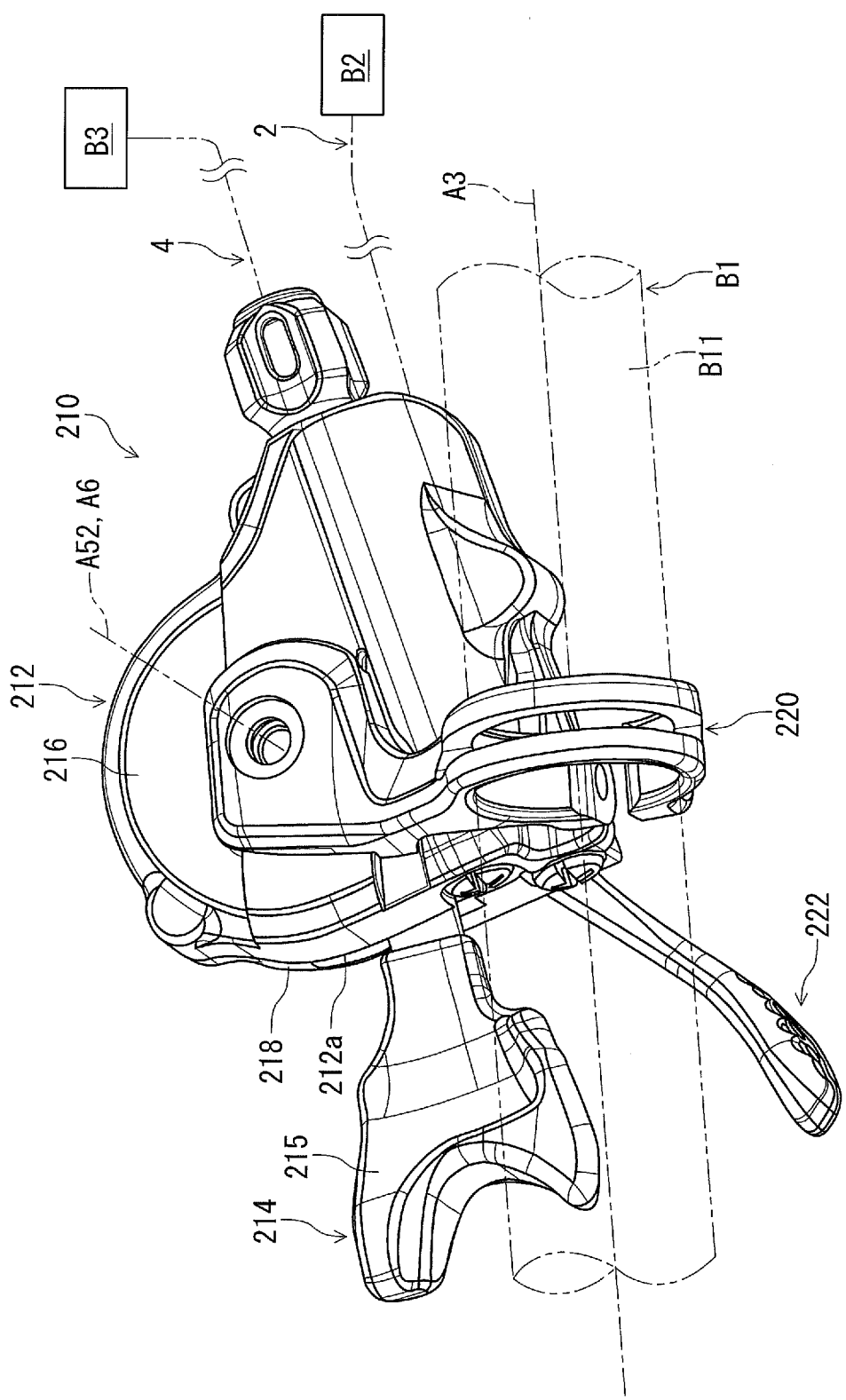
FIG. 17 is a perspective view of a bicycle operating device in accordance with a second embodiment.

As seen in FIG. 17, the bicycle operating device 210 is configured to be mounted to the bicycle body B1. The bicycle operating device 210 is configured to operate the bicycle component B2 configured to be operated via the operation cable 2. Unlike the bicycle operating device 10 in accordance with the first embodiment, the bicycle operating device 210 is configured to operate an additional bicycle component B3 configured to be operated via an additional operation cable 4 such as the Bowden cable. Possible examples of the additional bicycle component B3 include an adjustable seatpost assembly, a bicycle transmission, a suspension, and an intermediate take-up device.

The bicycle operating device 210 is a left hand side control device operated by the rider's left hand. It will be apparent to those skilled in the bicycle field that the configuration of the bicycle operating device 210 can be adapted to a right hand side control device that is operated by the rider's right hand.

As seen in FIG. 17, the bicycle operating device 210 comprises a base member 212 and an operating member 214. The base member 212 is configured to be mounted to the bicycle body B1 as well as the first embodiment. The base member 212 is configured to be fixedly attached to the tubular part B11 of the bicycle body B1. The operating member 214 is configured to be operated by a user.

In the illustrated embodiment, the base member 212 include a first housing 216, a second housing 218, and a mounting portion 220. The first housing 216 is secured to the second housing 218 via fasteners such as screws (not shown). The mounting portion 220 is configured to detachably couple the first housing 216 to the bicycle body B1. In the illustrated embodiment, the mounting portion 220 has a clamping structure configured to clamp the bicycle body B1. The mounting portion 220 is secured to the first housing 216. The mounting portion 220 can be integrally provided with the first housing 216 as a single unitary member if needed and/or desired.

As seen in FIG. 17, the bicycle operating device 210 comprises an additional operating member 222. The additional operating member 222 is configured to be operated by the user. The additional operating member 222 can be omitted from the bicycle operating device 210 if needed and/or desired.

Figure 18:
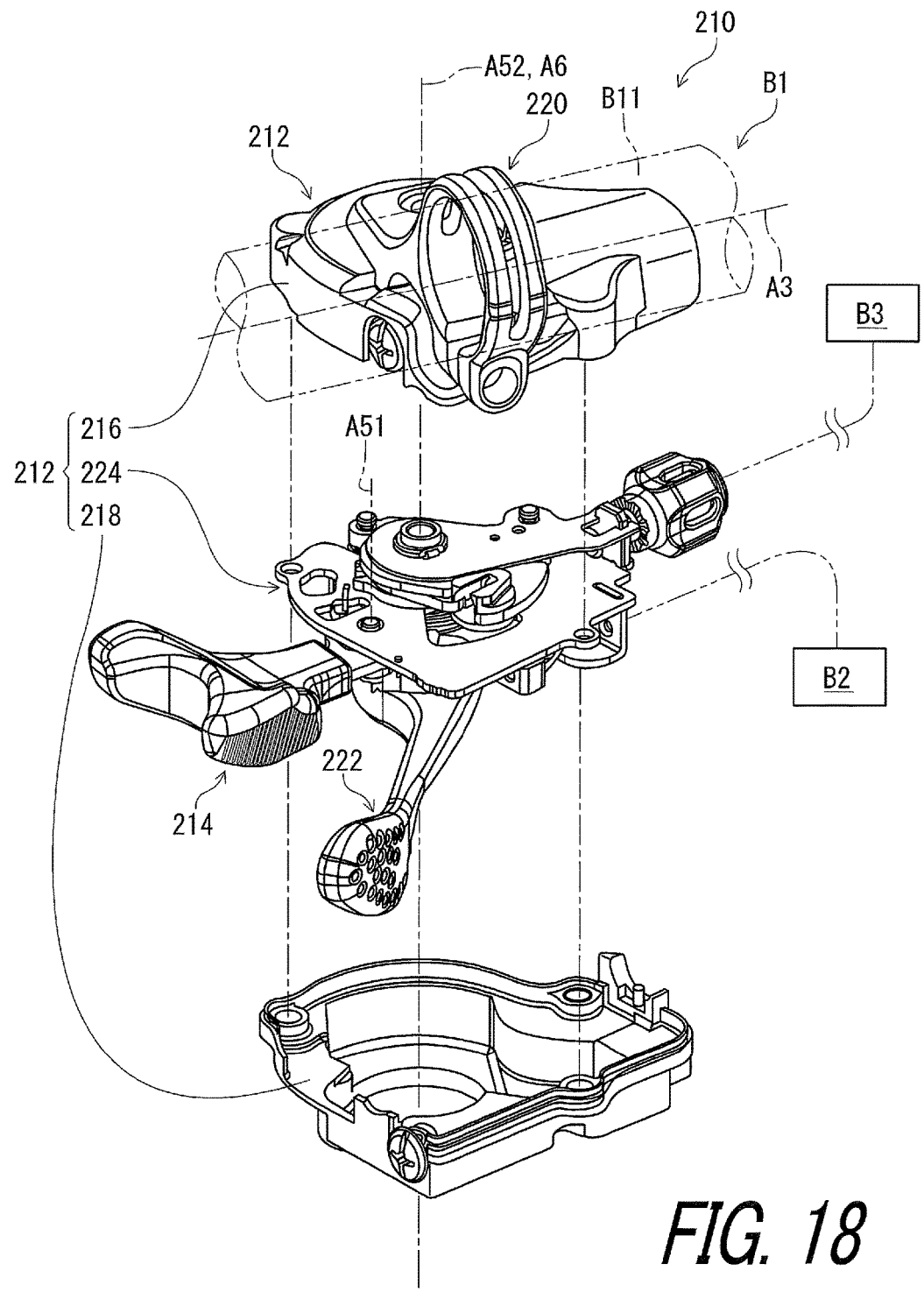
FIG. 18 is an exploded perspective view of the bicycle operating device illustrated in FIG. 17.

As seen in FIG. 18, the base member 12 further includes a base plate 224 secured to the first housing 216 and the second housing 218. The base plate 224 is provided between the first housing 216 and the second housing 218.

Figure 19:
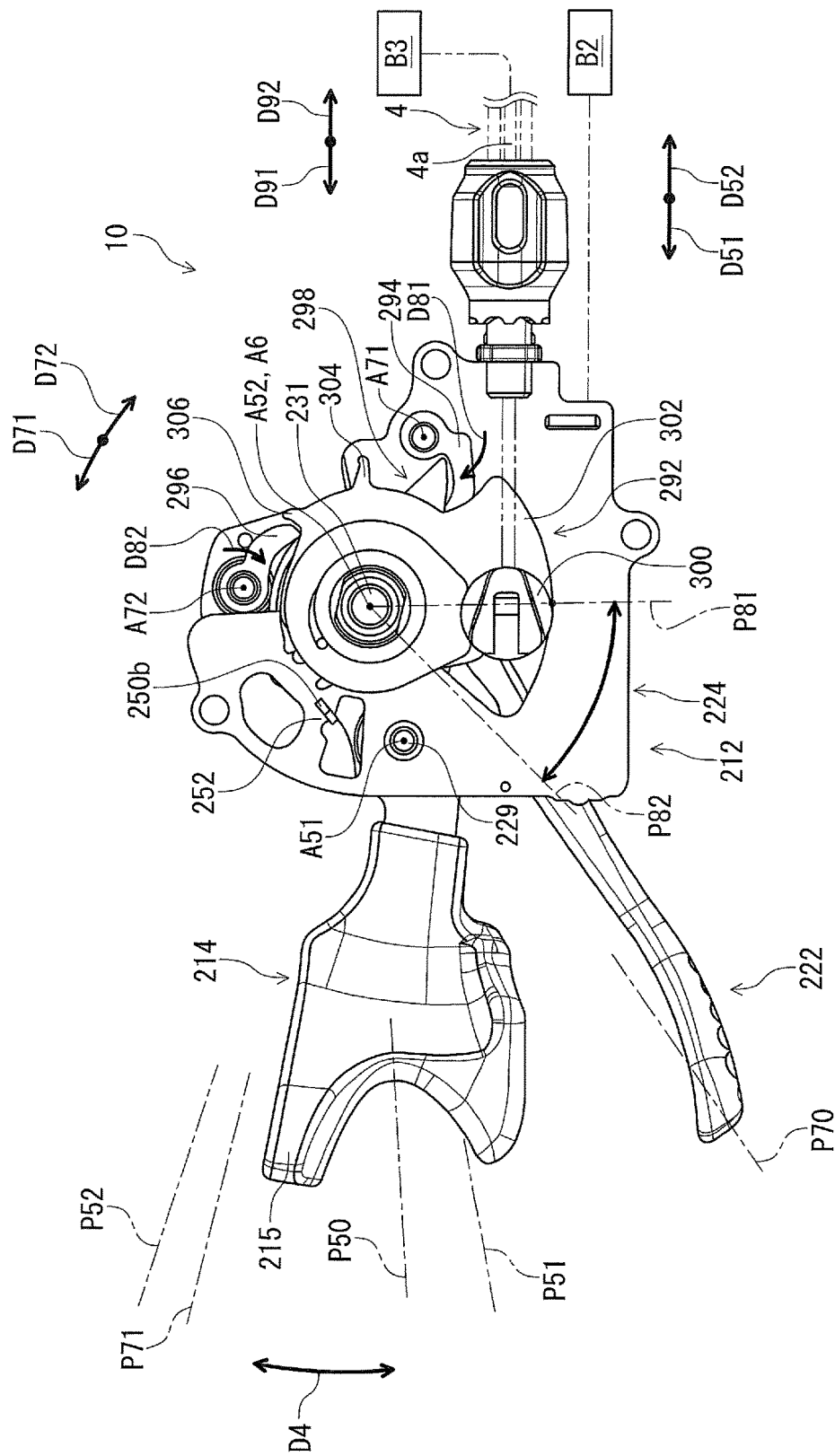
FIG. 19 is a top plan view of the bicycle operating device illustrated in FIG. 17 with a housing omitted (a rest position)

As seen in FIG. 19, the operating member 214 is movable relative to the base member 212 from a rest position P50 to a first operated position P51. The operating member 214 is movable relative to the base member 212 from the rest position P50 to a second operated position P52. The operating member 214 is configured to be operated by a user between the rest position P50 and the first operated position P51 and between the rest position P50 and the second operated position P52.

The rest position P50 is disposed between the first operated position P51 and the second operated position P52. The operating member 214 includes an operating end 215 configured to be operated by a user. As seen in FIG. 17, the operating end 215 is provided outside the base member 212. As seen in FIG. 19, the rest position P50, the first operated position P51, and the second operated position P52 are defined based on a position of the operating end 215 of the operating member 214 relative to the base member 212.

The operating end 215 is movable relative to the base member 212 along an operating direction D4 defined around a rotational axis A6 of the movable member 226. The rest position P50 is disposed between the first operated position P51 and the second operated position P52 in the operating direction D4. The first operated position P51 is disposed on an opposite side of the second operated position P52 relative to the rest position P50 in the operating direction D4.

Figure 20:
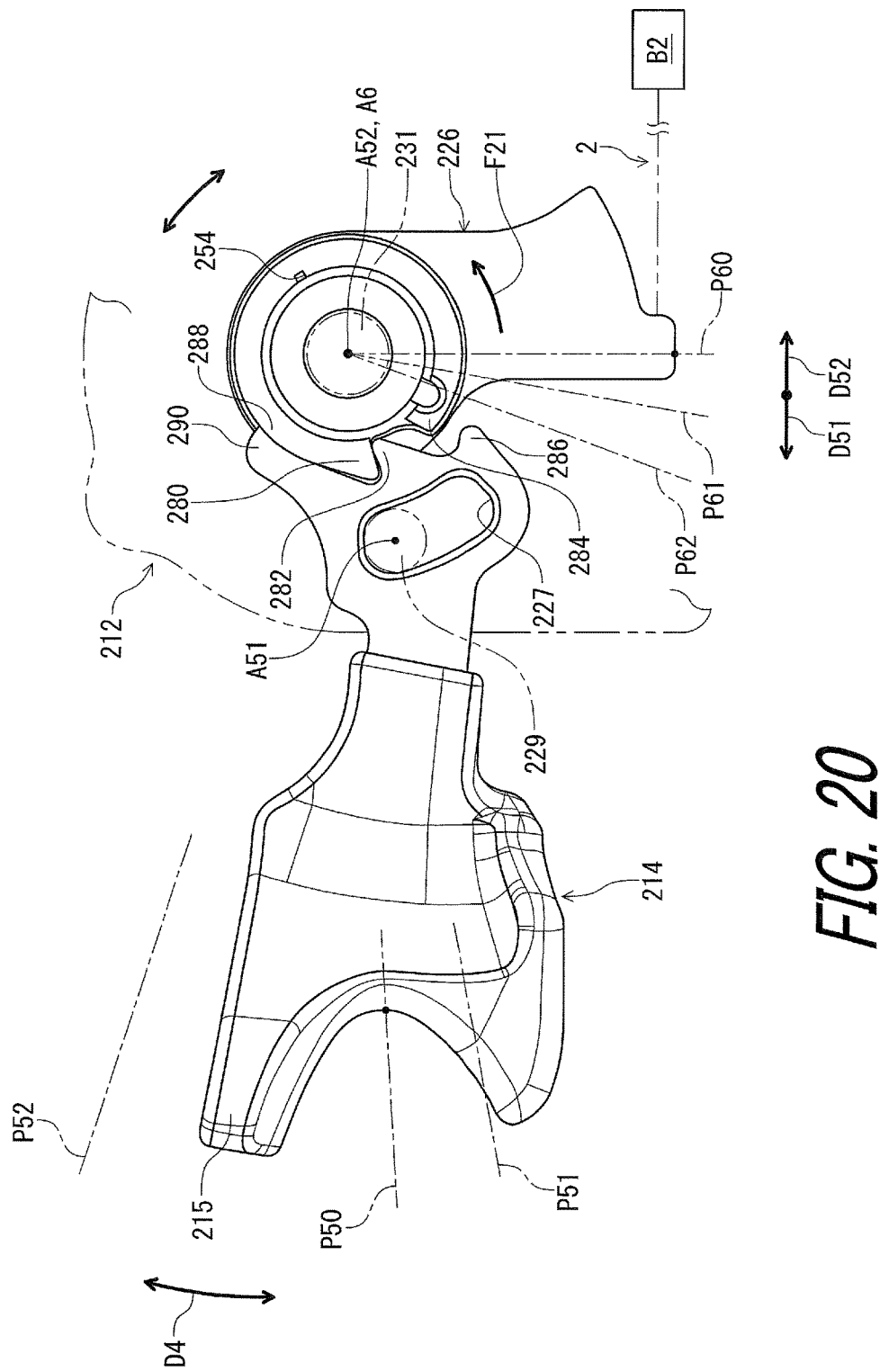
FIG. 20 is a top plan view of an operating member and a movable member of the bicycle operating device illustrated in FIG. 17 (the rest position)

In the illustrated embodiment, as seen in FIG. 20, the operating member 214 is pivotable relative to the base member 212 from the rest position P50 to the first operated position P51 about a first pivot axis A51. The operating member 214 is pivotable relative to the base member 212 from the rest position P50 to the second operated position P52 about a second pivot axis A52 different from the first pivot axis A51. The first pivot axis A51 is parallel to the second pivot axis A52 and is provided radially outward of the second pivot axis A52.

As seen in FIG. 20, the bicycle operating device 210 comprises a movable member 226. The movable member 226 is movable relative to the base member 212 (FIG. 18) to move the operation cable 2 in a pulling direction D51 and a releasing direction D52 opposite to the pulling direction D51. In the illustrated embodiment, the movable member 226 is movable relative to the base member 212 to move the inner wire 2b relative to the base member 12 in the pulling direction D51 and the releasing direction D52.

As seen in FIG. 17, the base member 212 includes an opening 212a provided on the second housing 218. The operating member 214 extends through the opening 212a. The operating member 214 is movable within the opening 212a relative to the base member 212.

Figure 21:
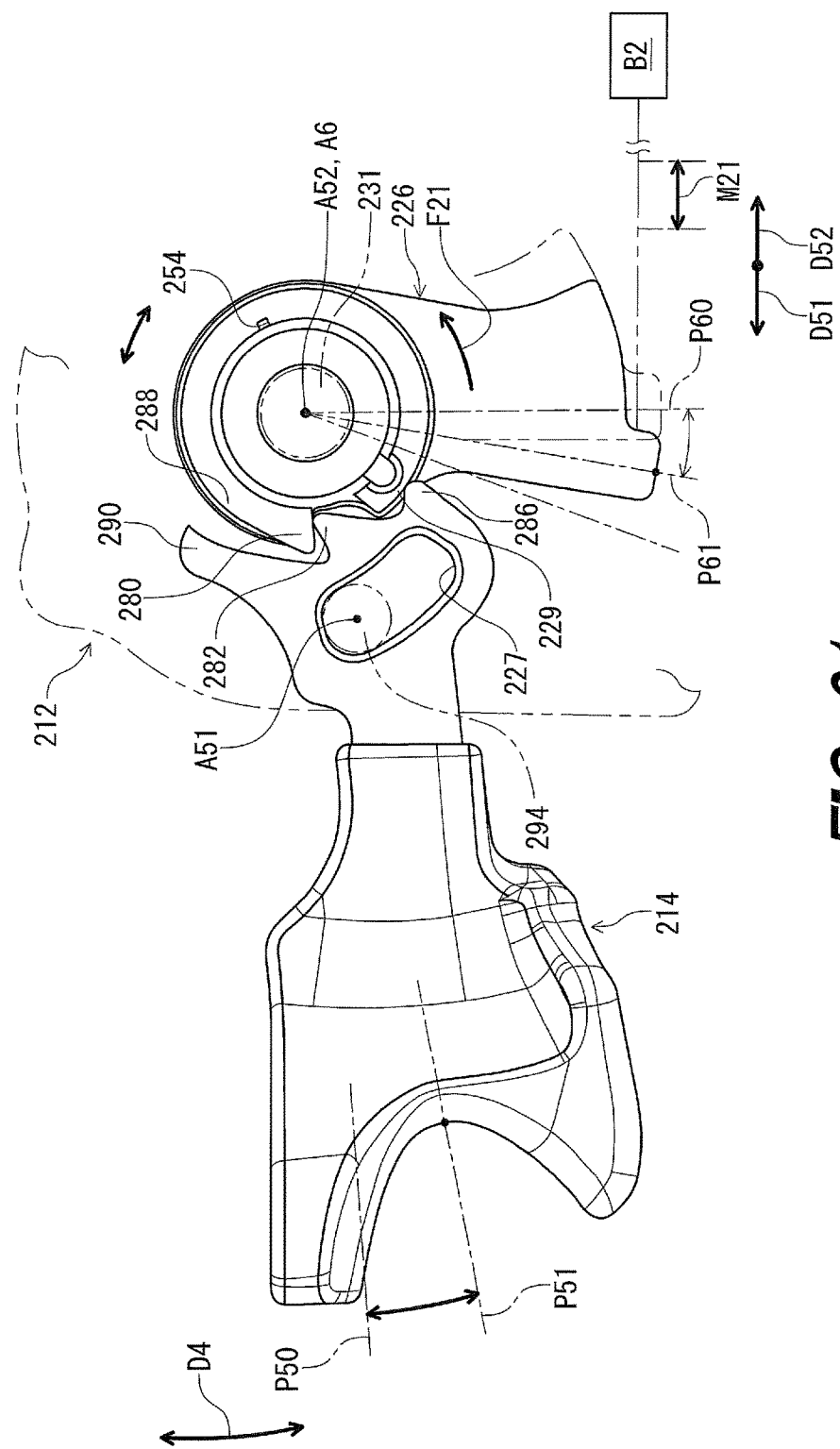
FIG. 21 is a top plan view of the operating member and the movable member of the bicycle operating device illustrated in FIG. 17 (a first operated position)

As seen in FIGS. 20 and 21, the movable member 226 is configured to move the operation cable 2 in the pulling direction D51 to operate the bicycle component B2 in response to a first movement of the operating member 214 from the rest position P50 to the first operated position P51. The movable member 226 is configured such that the operation cable 2 is movable in the releasing direction D52 in response to a release of the operating member 214 from the first operated position P51.

Figure 22:
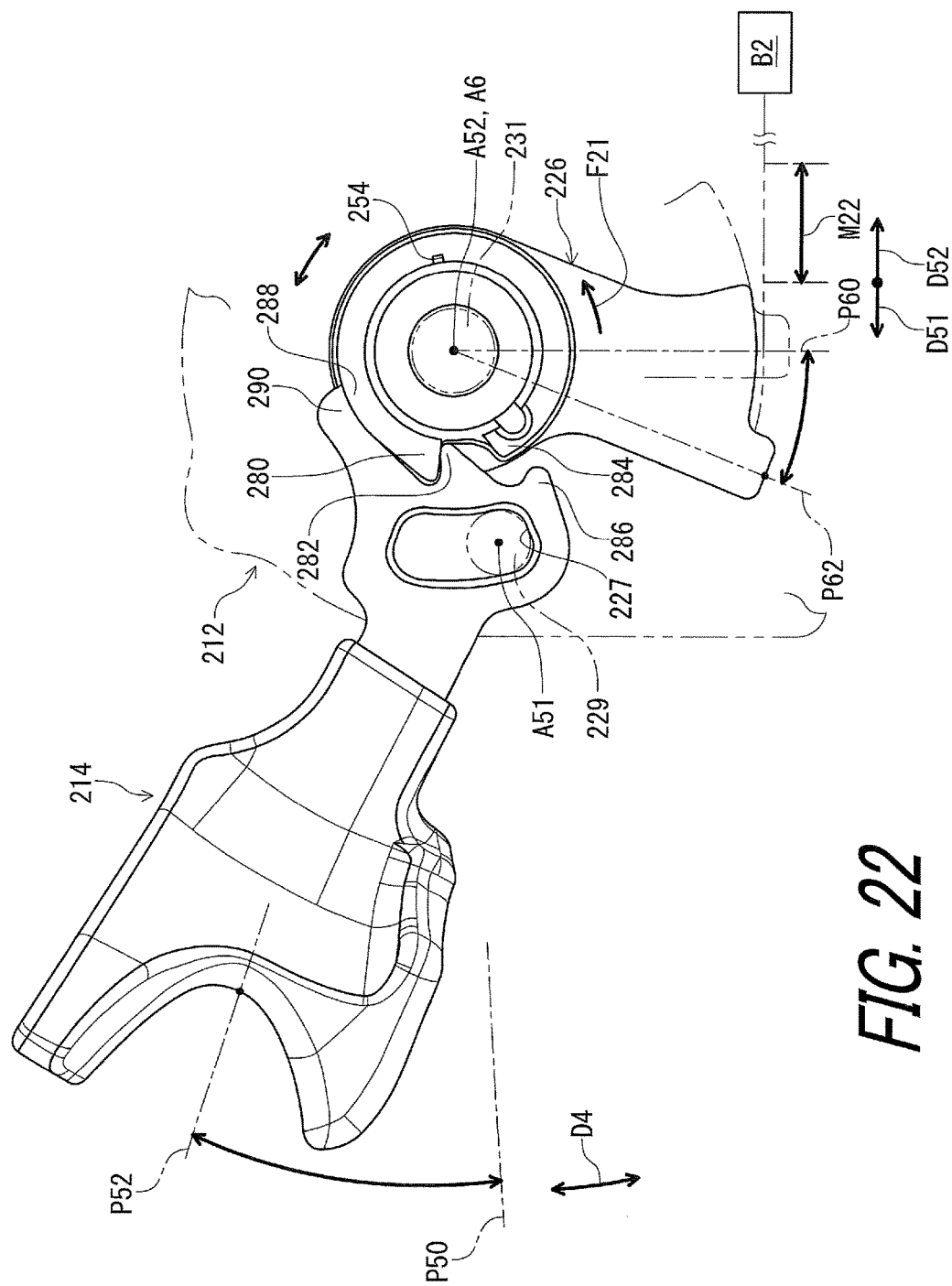
FIG. 22 is a top plan view of the operating member and the movable member of the bicycle operating device illustrated in FIG. 17 (a second operated position)

As seen in FIGS. 20 and 22, the movable member 226 is configured to move the operation cable 2 in the pulling direction D51 to operate the bicycle component B2 in response to a second movement of the operating member 214 from the rest position P50 to the second operated position P52. The movable member 226 is configured such that the operation cable 2 is movable in the releasing direction D52 in response to a release of the operating member 214 from the second operated position P52.

As seen in FIGS. 20 and 21, the movable member 226 is movable relative to the base member 212 from a release position P60 to a first pulling position P61 in response to the first movement of the operating member 214. The movable member 226 is movable relative to the base member 212 from the release position P60 to the first pulling position P61 to move the operation cable 2 in the pulling direction D51.

As seen in FIGS. 20 and 22, the movable member 226 is movable relative to the base member 212 from the release position P60 to a second pulling position P62 in response to the second movement of the operating member 214. The movable member 226 is movable relative to the base member 212 from the release position P60 to the second pulling position P62 to move the operation cable 2 in the pulling direction D51.

As seen in FIGS. 20 to 22, a first amount of movement M21 of the movable member 226 from the release position P60 to the first pulling position P61 is different from a second amount of movement M22 of the movable member 226 from the release position P60 to the second pulling position P62. In the illustrated embodiment, the first amount of movement M21 of the movable member 226 is smaller than the second amount of movement M22 of the movable member 226. However, the first amount of movement M21 of the movable member 226 can be larger than the second amount of movement M22 of the movable member 226 if needed and/or desired. Further, the first amount of movement M21 of the movable member 226 can be equal to the second amount of movement M22 of the movable member 226 if needed and/or desired.

In the illustrated embodiment, as seen in FIG. 20, the movable member 226 is rotatable relative to the base member 212 about the rotational axis A6. While the second pivot axis A52 coincides with the rotational axis A6 in the illustrated embodiment, the second pivot axis A52 can be offset from the rotational axis A6. The rotational axis A6, the first pivot axis A51, and the second pivot axis A52 are non-parallel to the center axis A3 of the tubular part B11 of the bicycle body B1 in a state where the base member 212 is fixedly attached to the tubular part B11 (FIGS. 17 and 18).

As seen in FIG. 20, the operating member 214 includes an elongated hole 227. The base member 212 includes a pivot shaft 229 extending through the elongated hole 227 and defining the first pivot axis A51. The elongated hole 227 and the pivot shaft 229 define an angular range where the operating member 214 is pivotable relative to the base member 212 about the second pivot axis A52. The base member 212 includes an additional pivot shaft 231 defining the second pivot axis A52. In the illustrated embodiment, the additional pivot shaft 231 also defines the rotational axis A6.

Figure 23:
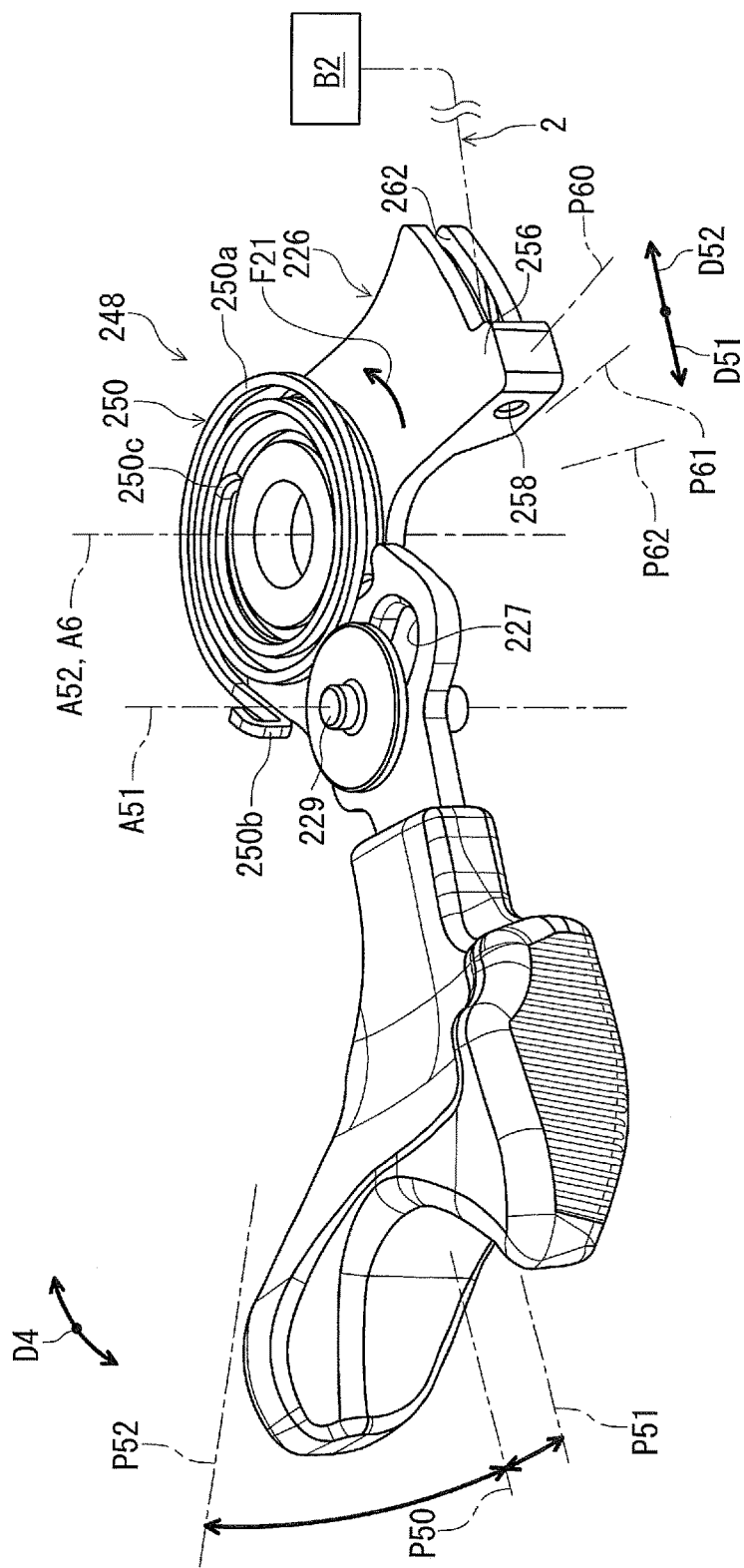
FIG. 23 is a perspective view of the operating member, the movable member and a biasing member of the bicycle operating device illustrated in FIG. 17 (the rest position)

As seen in FIG. 23, the bicycle operating device 210 further comprises a biasing structure 248. The biasing structure 248 is configured to bias the movable member 226 relative to the base member 212 so that the operation cable 2 is moved relative to the base member 212 in the releasing direction D52 in response to the release of the operating member 214 from each of the first operated position P51 and the second operated position P52. In the illustrated embodiment, the biasing structure 248 is configured to apply a biasing force F21 to the movable member 226.

In the illustrated embodiment, the biasing structure 248 includes a biasing member 250 configured to bias the movable member 226 relative to the base member 212. The biasing member 250 is provided in the base member 212 (FIG. 17). While the biasing member 250 is a torsion coil spring in the illustrated embodiment, the biasing member 250 can be other biasing members such as a compression coil spring and a tension coil spring.

As seen in FIG. 23, the biasing member 250 includes a coiled body 250a, a first end portion 250b, and a second end portion 250c. As seen in FIGS. 19 and 20, the biasing structure 248 includes a first attachment portion 252 (FIG. 19) and a second attachment portion 254 (FIG. 20). As seen in FIG. 19, the first attachment portion 252 is provided in the base plate 224 of the base member 212. The first end portion 250b is hooked to the first attachment portion 252. As seen in FIG. 20, the second attachment portion 254 is provided on the movable member 226 as an attachment opening. The second end portion 250c (FIG. 21) is hooked to the second attachment portion 254.

As seen in FIG. 23, the biasing structure 248 is configured to bias the movable member 226 from the first pulling position P61 toward the release position P60 to move the operation cable 2 in the releasing direction D52 in response to the release of the operating member 214 from the first operated position P51. The biasing structure 248 is configured to bias the movable member 226 from the second pulling position P62 toward the release position P60 to move the operation cable 2 in the releasing direction D52 in response to the release of the operating member 214 from the second operated position P52.

While the bicycle operating device 210 comprises the biasing structure 248 in the illustrated embodiment, the biasing structure 248 can be omitted from the bicycle operating device 210 if needed and/or desired. In such an embodiment, the movable member 226 can be pulled by a biasing structure provided in the bicycle component B2 via the operation cable 2.

Figure 24:
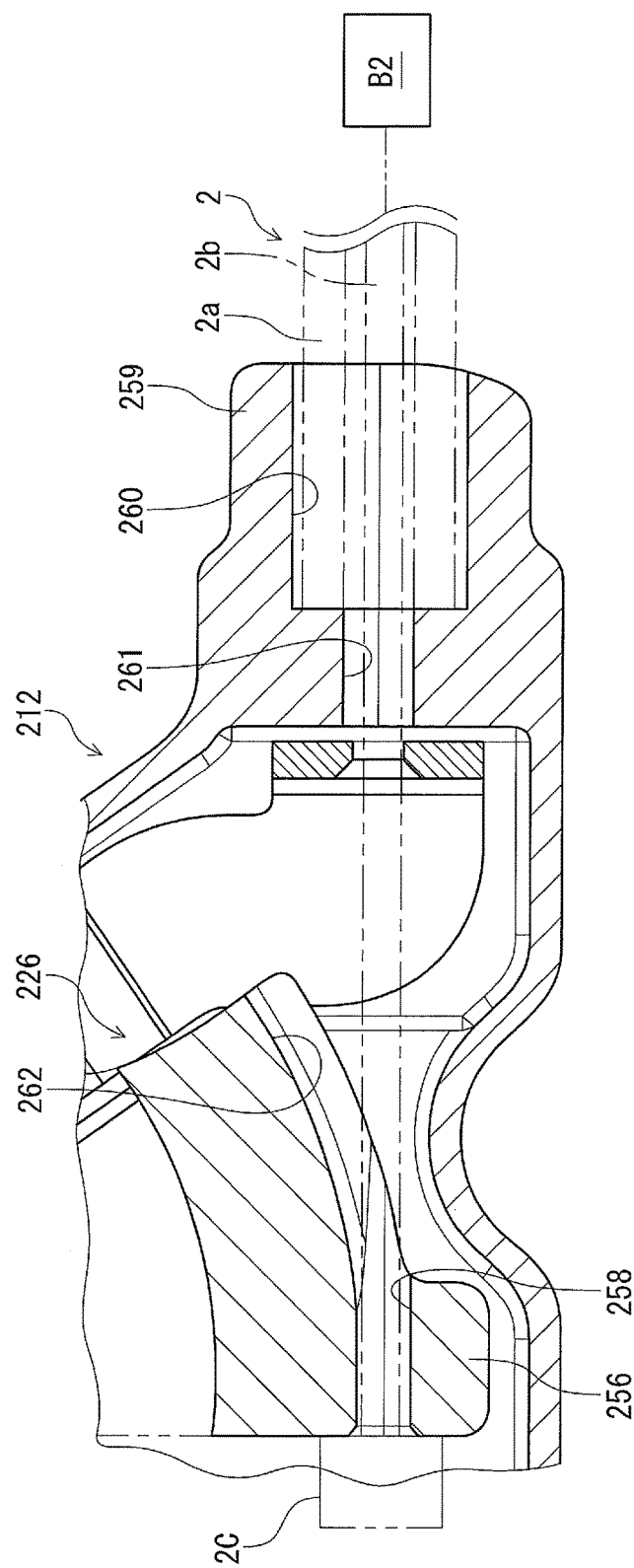
FIG. 24 is a cross-sectional view of the bicycle operating device illustrated in FIG. 17.

As seen in FIGS. 23 and 24, the movable member 226 includes a cable attachment portion 256 to which the inner wire 2b of the operation cable 2 is to be attached. In the illustrated embodiment, the cable attachment portion 256 includes a through-hole 258. The inner wire 2b of the operation cable 2 extends through the through-hole 258.

As seen in FIG. 24, the base member 212 includes an outer-casing receiving portion 259 configured to receive the outer casing 2a of the operation cable 2. The outer-casing receiving portion 259 includes a second recess 260 and a guide hole 261. The guide hole 261 extends from the second recess 260. The end of the outer casing 2a is provided in the second recess 260. The inner wire 2b of the operation cable 2 extends through the guide hole 261.

As seen in FIGS. 23 and 24, the movable member 226 includes a groove 262. The groove 262 is connected to the through-hole 258 of the outer-casing receiving portion 259. The inner wire 2b of the operation cable 2 extends through the groove 262.

As seen in FIG. 20, the movable member 226 includes a first contact part 280. The operating member 214 includes a second contact part 282 contactable with the first contact part 280. The movable member 226 includes a third contact part 284. The operating member 214 includes a fourth contact part 286 contactable with the third contact part 284. The movable member 226 includes a fifth contact part 288. The operating member 214 includes a sixth contact part 290 contactable with the fifth contact part 288.

As seen in FIG. 20, the second contact part 282 is in contact with the first contact part 280 in a rest state where the operating member 214 is disposed at the rest position P50. The fourth contact part 286 is spaced apart from the third contact part 284 in the rest state. The sixth contact part 290 is in contact with the fifth contact part 288 to position the operating member 214 at the rest position P50 relative to the base member 212 in the rest state.

The biasing force F21 presses the first contact part 280 to the second contact part 282. The biasing force F21 is transmitted from the movable member 226 to the operating member 214 via the first contact part 280 and the second contact part 282. The contact between the fifth contact part 288 and the sixth contact part 290 restricts the operating member 214 from pivoting relative to the base member 212 about the first pivot axis A51 from the rest position P50 toward the second operated position P52. This causes the operating member 214 and the movable member 226 to be positioned at the rest position P50 and the release position P60.

As seen in FIG. 21, the second contact part 282 is in contact with the first contact part 280 in a first operated state where the operating member 214 is disposed at the first operated position P51. The fourth contact part 286 is in contact with the third contact part 284 to position the operating member 214 at the first operated position P51 relative to the base member 212 in the first operated state. The sixth contact part 290 is spaced apart from the fifth contact part 288 in the first operated state.

As seen in FIG. 22, the second contact part 282 is in contact with the first contact part 280 in a second operated state where the operating member 214 is disposed at the second operated position P52. The fourth contact part 286 is spaced apart from the third contact part 284 in the second operated state. The sixth contact part 290 is in contact with the fifth contact part 288 to position the operating member 214 at the second operated position P52 relative to the base member 212 in the second operated state.

As seen in FIGS. 20 and 21, when the operating member 214 is operated by a user from the rest position P50 toward the first operated position P51, the operating member 214 is pivoted relative to the base member 212 about the first pivot axis A51 toward the first operated position P51. This presses the movable member 226 via the first contact part 280 and the second contact part 282 to rotate relative to the base member 212 about the rotational axis A6 from the release position P60 toward the first pulling position P61 against the biasing force F21.

As seen in FIG. 21, the contact between the third contact part 284 and the fourth contact part 286 stops the pivotal movement of the operating member 214 at the first operated position P51 and the rotation of the movable member 226 at the first pulling position P61. Accordingly, the operation cable 2 is pulled relative to the base member 212 in the pulling direction D51 by the first amount of movement M21. The movable member 226 is positioned at the first pulling position P61 while the operating member 214 is positioned at the first operated position P51 by the user, allowing the first amount of movement M1 to be maintained.

As seen in FIGS. 20 and 21, when the operating member 214 is released by the user from the first operated position P51, the movable member 226 is returned to relative to the release position P60 by the biasing force F21. This allows the operation cable 2 to be released (moved) in the releasing direction D52. The contact between the fifth contact part 288 and the sixth contact part 290 positions the operating member 214 at the rest position P50 and the movable member 226 at the release position P60.

As seen in FIGS. 20 and 22, when the operating member 214 is operated by the user from the rest position P50 toward the second operated position P52, the second contact part 282 and the sixth contact part 290 respectively keep in contact with the first contact part 280 and the fifth contact part 288. Thus, the operating member 214 and the movable member 226 are pivoted relative to the base member 212 about the second pivot axis A52 toward the second operated position P52 and the second pulling position P62 against the biasing force F21.

As seen in FIG. 22, the contact between the pivot shaft 229 and an edge of the elongated hole 227 stops the pivotal movement of the operating member 214 at the second operated position P52 and the rotation of the movable member 16 at the second pulling position P62. Accordingly, the operation cable 2 is pulled relative to the base member 212 in the pulling direction D11 by the second amount of movement M22. The movable member 226 is positioned at the second pulling position P62 while the operating member 214 is positioned at the second operated position P52 by the user, allowing the second amount of movement M22 to be maintained.

As seen in FIG. 22, when the operating member 214 is released by the user from the second operated position P52, the movable member 226 is returned to the release position P60 by the biasing force F21. This allows the operation cable 2 to be released (moved) in the releasing direction D52. The operating member 214 is positioned at the rest position P50 by the first contact part 280, the second contact part 282, the fifth contact part 288, and the sixth contact part 290. Thus, the movable member 226 is positioned at the release position P60.

Therefore, in this embodiment, the operating device 210 does not include a positioning structure configured to position the movable member 226 at the first pulling position P61 and the second pulling position P62 relative to the base member 212 in a state where the operating force is not applied from the rider's finger(s) to the operating member 214. In the present application, possible examples of the phrase "release of the operating member" as used herein include moving the rider's finger(s) away from an operating member such as the operating member 214, and removing, from the operating member, an operating force applied from the rider's finger(s) to the operating member. In the embodiment, however, the operating device 210 includes a positioning structure which positions the movable member 226 only at the release position P60 in a state where the operating force is not applied from the rider's finger(s) to the operating member 214. In the embodiment, however, the operating device 210 includes a positioning structure which positions the movable member 226 only at the release position P60 in a state where the operating force is not applied from the rider's finger(s) to the operating member 214.

With the bicycle operating device 210, the rest position P50 is disposed between the first operated position P51 and the second operated position P52. The movable member 226 is configured to move the operation cable 2 in the pulling direction D51 to operate the bicycle component B2 in response to the first movement of the operating member 214 from the rest position P50 to the first operated position P51. The movable member 226 is configured to move the operation cable 2 in the pulling direction D51 to operate the bicycle component B2 in response to the second movement of the operating member 214 from the rest position P50 to the second operated position P52. Accordingly, it is possible to move the operation cable 2 in the pulling direction D51 even if the operating member 214 is operated in different ways.

Furthermore, the movable member 226 is configured such that the operation cable 2 is movable in the releasing direction D12 in response to the release of the operating member 214 from the first operated position P51. The movable member 226 is configured such that the operation cable 2 is movable in the releasing direction D12 in response to the release of the operating member 214 from the second operated position P52. Accordingly, it is possible to return the operation cable 2 to an initial position by releasing the operating member 214, allowing the structure of the bicycle operating device 210 to be simplified.

As seen in FIG. 19, in the bicycle operating device 210, the additional bicycle component B3 can be operated using the additional operating member 222. The additional operating member 222 is pivotable relative to the base member 212 about the second pivot axis A52 (the rotational axis A6) between a rest position P70 and an operated position P71. The additional operating member 222 is biased toward the rest position P70 by a biasing element (not shown).

The bicycle operating device 210 further includes a take-up member 292, a positioning pawl 294, a winding pawl 296, and a control member 298. The take-up member 292 is rotatable relative to the base plate 224 about the rotational axis A6 between a first winding position P81 and a second winding position P82. The take-up member 292 is biased by a biasing element (not shown) to rotate relative to the base plate 224 about the rotational axis A6 in a first rotational direction D71. The control member 298 is rotatable relative to the base plate 224 and the take-up member 292 about the rotational axis A6. The control member 298 is biased by a biasing element (not shown) to rotate relative to the base plate 224 in the first rotational direction D71. The control member 298 is provided between the take-up member 292 and the base plate 224.

As seen in FIG. 19, the take-up member 292 includes an additional cable attachment portion 300 to which an inner wire 4b of the additional operation cable 4 is to be attached. The take-up member 292 includes a first protrusion 302, a second protrusion 304, and a third protrusion 306. The first protrusion 302, the second protrusion 304, and the third protrusion 306 are spaced apart from each other.

The positioning pawl 294 is configured to selectively engage with the first protrusion 302 and the second protrusion 304 to position the take-up member 292 at the first winding position P81 and the second winding position P82. The winding pawl 296 is contactable with the third protrusion 306 to transmit a pivotal movement of the additional operating member 222 to the take-up member 292 via the third protrusion 306. The positioning pawl 294 is pivotably mounted on the base plate 224 of the base member 212 about a pivot axis A71. The positioning pawl 294 is biased by a biasing element (not shown) to pivot relative to the base plate 224 about the pivot axis A71 in a pivotal direction D81. The winding pawl 296 is pivotably mounted on the additional operating member 222 about a pivot axis A72. The winding pawl 296 is biased by a biasing element (not shown) to pivot relative to the additional operating member 222 about the pivot axis A72 in a pivotal direction D82. The winding pawl 296 is movable relative to the base member 212 in response to the pivotal movement of the additional operating member 222.

Figure 25:
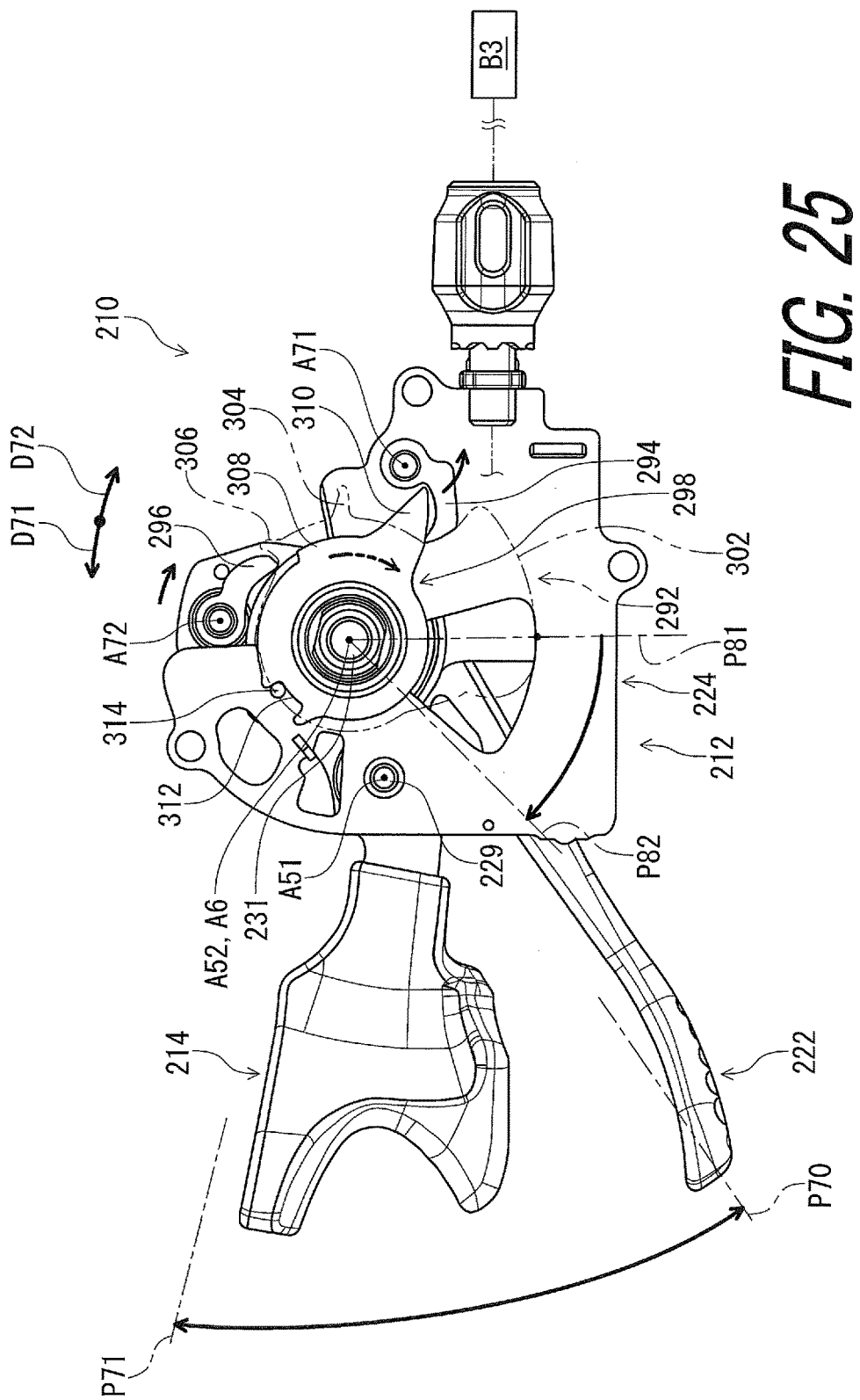
FIG. 25 is a top plan view of the bicycle operating device illustrated in FIG. 17 with a housing omitted (a first pulling position)

In FIG. 25, the take-up member 292 is omitted. As seen in FIG. 25, the control member 298 includes a receiving portion 308, a release pawl 310, and a cutout 312. The winding pawl 296 is contactable with the receiving portion 308 to transmit the pivotal movement of the additional operating member 222 to the control member 298 via the receiving portion 308. The release pawl 310 is contactable with the positioning pawl 294 to release the engagement between the positioning pawl 294 and the second protrusion 304. The base member 212 includes a pin 314 secured to the base plate 224. The pin 314 is provided in the cutout 312 to define a rotational range of the control member 298. The control member 298 is positioned by the pin 314 at a rest position shown in FIG. 25.

As seen in FIG. 25, the winding pawl 296 moves in a second rotational direction D72 opposite to the first rotational direction D71 in response to the pivotal movement of the additional operating member 222 from the rest position P70 toward the operated position P71. In a state where the take-up member 292 is positioned at the first winding position P81, the winding pawl 296 presses the third protrusion 306 so that the take-up member 292 rotates relative to the base member 212 about the rotational axis A6 from the first winding position P81 toward the second winding position P82.

The winding pawl 296 is disposed radially outward of the receiving portion 308 of the control member 298 in a state where the winding pawl 296 engages with the third protrusion 306. Thus, the winding pawl 296 presses the third protrusion 306 in the second rotational direction D72 without contacting the receiving portion 308.

The rotation of the take-up member 292 brings the second protrusion 304 into contact with the positioning pawl 294. Further rotation of the take-up member 292 moves the positioning pawl 294 away from the take-up member 292 via the second protrusion 304. When the additional operating member 222 is pivoted to the operated position P71, the second protrusion 304 passes through the positioning pawl 294 in the second rotational direction D72. When the additional operating member 222 is released by the user from the operated position P71, the take-up member 292 is rotated relative to the base plate 224 about the rotational axis A6 in the first rotational direction D71 by the biasing force of the biasing element (not shown). Thus, the positioning pawl 294 engages with the second protrusion 304 to position the take-up member 292 at the second winding position P82.

Figure 26:
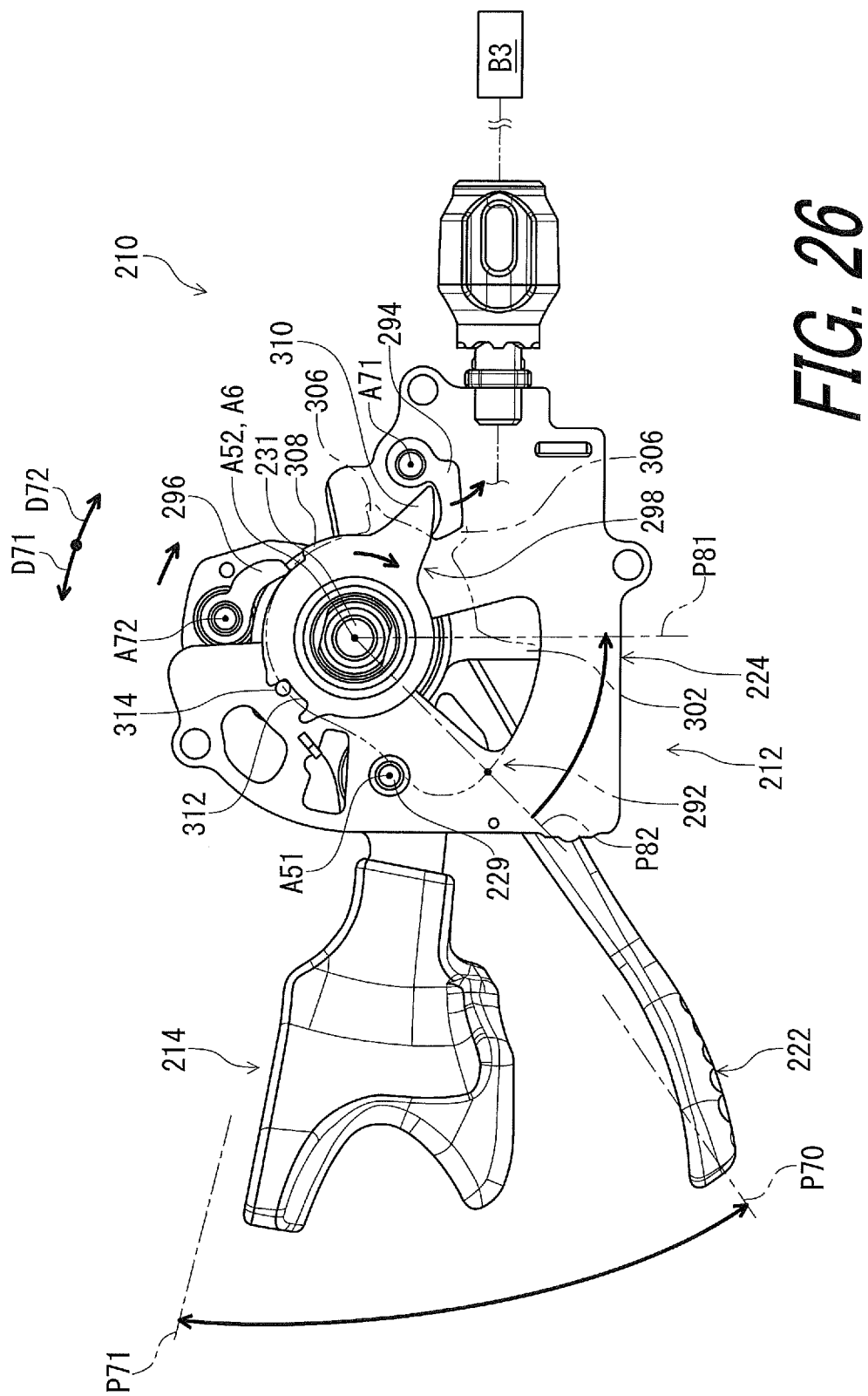
FIG. 26 is a top plan view of the bicycle operating device illustrated in FIG. 17 with the housing omitted (a second pulling position).

As seen in FIG. 26, the winding pawl 296 moves relative to the base member 212 in the second rotational direction D72 in response to the pivotal movement of the additional operating member 222 from the rest position P70 toward the operated position P71. In a state where the take-up member 292 is positioned at the second winding position P82, an end of the winding pawl 296 is contactable with the receiving portion 308. Accordingly, the winding pawl 296 presses the receiving portion 308 of the control member 298 so that the control member 298 rotates relative to the base member 212 and the take-up member 292 about the rotational axis A6 in the second rotational direction D72. Since the winding pawl 296 does not contact the third protrusion 306, the take-up member 292 is positioned at the second winding position P82 without rotating relative to the base plate 224. The additional operating member 222 is pivoted until an edge of the cutout 312 contacts the pin 314.

The rotation of the control member 298 brings the release pawl 310 into contact with the positioning pawl 294. Further rotation of the control member 298 moves the positioning pawl 294 away from the take-up member 292 via the release pawl 310 so that the engagement between the positioning pawl 294 and the second protrusion 304 is released. Thus, the take-up member 292 is rotated relative to the base plate 224 in the first rotational direction D71 by the biasing force of the biasing element (not shown). At this time, the first protrusion 302 contacts the positioning pawl 294 to position the take-up member 292 at the first winding position P81 since the first protrusion 302 protrudes radially more outward than the second protrusion 304.

The control member 298 is rotated relative to the base plate 224 about the rotational axis A6 in the first rotational direction D71 by the biasing force of the biasing element (not shown) in response to the release of the additional operating member 222 from the operated position P71. Thus, the positioning pawl 294 engages with the first protrusion 302 to position the take-up member 292 at the first winding position P81. Accordingly, it is possible to switch a position of the inner wire 4b of the additional operation cable 4 between two positions corresponding to the first and second winding positions P81 and P82 by only operating the additional operating member 222 from the rest position P70 to the operated position P71.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member configured to be mounted to a bicycle body;
   an operating member movable relative to the base member from a rest position to a first operated position and movable relative to the base member from the rest position to a second operated position, the rest position being disposed between the first operated position and the second operated position;
   a movable member movable relative to the base member to move an operation cable in a pulling direction and a releasing direction opposite to the pulling direction;
   the movable member being configured to move the operation cable in the pulling direction to operate a bicycle component in response to a first movement of the operating member from the rest position to the first operated position, the movable member being configured such that the operation cable is movable in the releasing direction in response to a release of the operating member from the first operated position; and
   the movable member being configured to move the operation cable in the pulling direction to operate the bicycle component in response to a second movement of the operating member from the rest position to the second operated position, the movable member being configured such that the operation cable is movable in the releasing direction in response to a release of the operating member from the second operated position.

2. The bicycle operating device according to claim 1, wherein
   the movable member is movable relative to the base member from a release position to a first pulling position in response to the first movement of the operating member,
   the movable member is movable relative to the base member from the release position to a second pulling position in response to the second movement of the operating member, and
   a first amount of movement of the movable member from the release position to the first pulling position is different from a second amount of movement of the movable member from the release position to the second pulling position.

3. The bicycle operating device according to claim 2, wherein
   the first amount of movement of the movable member is smaller than the second amount of movement of the movable member.

4. The bicycle operating device according to claim 2, wherein
   the movable member is movable relative to the base member from the release position to the first pulling position to move the operation cable in the pulling direction, and
   the movable member is movable relative to the base member from the release position to the second pulling position to move the operation cable in the pulling direction.

5. The bicycle operating device according to claim 1, further comprising:
   a biasing structure configured to bias the movable member relative to the base member so that the operation cable is moved relative to the base member in the releasing direction in response to the release of the operating member from each of the first operated position and the second operated position.

6. The bicycle operating device according to claim 5, wherein
   the movable member is movable relative to the base member from a release position to a first pulling position in response to the first movement of the operating member,
   the movable member is movable relative to the base member from the release position to a second pulling position in response to the second movement of the operating member,
   the biasing structure is configured to bias the movable member from the first pulling position toward the release position to move the operation cable in the releasing direction in response to the release of the operating member from the first operated position, and
   the biasing structure is configured to bias the movable member from the second pulling position toward the release position to move the operation cable in the releasing direction in response to the release of the operating member from the second operated position.

7. The bicycle operating device according to claim 1, wherein
   the movable member includes a cable attachment portion to which an inner wire of the operation cable is to be attached.

8. The bicycle operating device according to claim 1, wherein
   the base member includes an outer-casing receiving portion configured to receive an outer casing of the operation cable.

9. The bicycle operating device according to claim 1, wherein
   the base member includes a guide portion configured to guide the operation cable in the pulling direction.

10. The bicycle operating device according to claim 1, wherein
    the operating member is pivotably coupled to the movable member about a pivot axis.

11. The bicycle operating device according to claim 10, wherein
the movable member is rotatable relative to the base member about a rotational axis, and
the pivot axis of the operating member is parallel to the rotational axis of the movable member.

12. The bicycle operating device according to claim 1, wherein
the movable member is rotatable relative to the base member about a center axis of a tubular part of the bicycle body in a state where the base member is fixedly attached to the tubular part.

13. The bicycle operating device according to claim 1, wherein
the base member is configured to be fixedly attached to a tubular part of the bicycle body, and
the movable member is rotatable relative to the base member about a rotational axis.

14. The bicycle operating device according to claim 1, wherein
the base member includes a first contact portion contactable with the operating member, and
the operating member is in contact with the first contact portion in a first operated state where the operating member is disposed at the first operated position.

15. The bicycle operating device according to claim 14, wherein
the operating member is in contact with the first contact portion in a rest state where the operating member is disposed at the rest position.

16. The bicycle operating device according to claim 14, wherein
the base member includes a second contact portion contactable with at least one of the operating member and the movable member, and
the at least one of the operating member and the movable member is in contact with the second contact portion in a second operated state where the operating member is disposed at the second operated position.

17. The bicycle operating device according to claim 16, wherein
the operating member is pivotably coupled to the movable member about a pivot axis between a first position and a second position, and
the movable member includes
a first positioning portion contactable with the operating member in a state where the operating member is disposed at the first position relative to the base member, and
a second positioning portion contactable with the operating member in a state where the operating member is disposed at the second position relative to the base member.

18. The bicycle operating device according to claim 17, wherein
the operating member is in contact with the first contact portion and the first positioning portion in the first operated state, and
the operating member is in contact with the second contact portion and the second positioning portion in the second operated state.

19. The bicycle operating device according to claim 18, wherein
the operating member is in contact with the first contact portion and the second positioning portion in a rest state where the operating member is disposed at the rest position relative to the base member.

20. The bicycle operating device according to claim 1, wherein
the operating member is pivotable relative to the base member from the rest position to the first operated position about a first pivot axis, and
the operating member is pivotable relative to the base member from the rest position to the second operated position about a second pivot axis different from the first pivot axis.

21. The bicycle operating device according to claim 20, wherein
the movable member is rotatable relative to the base member about a rotational axis,
the second pivot axis coincides with the rotational axis, and
the first pivot axis is parallel to the second pivot axis and is provided radially outward of the second pivot axis.

22. The bicycle operating device according to claim 20, wherein
the movable member includes a first contact part,
the operating member includes a second contact part contactable with the first contact part,
the second contact part is in contact with the first contact part in a first operated state where the operating member is disposed at the first operated position, and
the second contact part is in contact with the first contact part in a second operated state where the operating member is disposed at the second operated position.

23. The bicycle operating device according to claim 22, wherein
the movable member includes a third contact part,
the operating member includes a fourth contact part contactable with the third contact part,
the fourth contact part is in contact with the third contact part to position the operating member at the first operated position relative to the base member in the first operated state, and
the fourth contact part is spaced apart from the third contact part in the second operated state.

24. The bicycle operating device according to claim 23, wherein
the movable member includes a fifth contact part,
the operating member includes a sixth contact part contactable with the fifth contact part,
the sixth contact part is spaced apart from the fifth contact part in the first operated state, and
the sixth contact part is in contact with the fifth contact part to position the operating member at the second operated position relative to the base member in the second operated state.

25. The bicycle operating device according to claim 20, wherein
the operating member includes an elongated hole,
the base member includes a pivot shaft extending through the elongated hole and defining the first pivot axis, and
the elongated hole and the pivot shaft define an angular range where the operating member is pivotable relative to the base member about the second pivot axis.

26. The bicycle operating device according to claim 1, wherein
the operating member is pivotably coupled to the movable member about a pivot axis without via the base member.

27. The bicycle operating device according to claim 1, wherein
the operating member is pivotably coupled to the movable member about a pivot axis so that the pivot axis is moved relative to the base member in the first movement and the second movement of the operating member.

28. The bicycle operating device according to claim 1, wherein
the operating member is movable relative to the base member and the movable member from the rest position to the first operated position in the first movement, and
the operating member is movable together with the movable member relative to the base member from the rest position to the second operated position in the second movement.

29. The bicycle operating device according to claim 1, wherein
the movable member is movable relative to the base member from a release position to a first pulling position in response to the first movement of the operating member,
the movable member is movable relative to the base member from the first pulling position to the release position in response to the release of the operating member from the first operated position,
the movable member is movable relative to the base member from the release position to a second pulling position in response to the second movement of the operating member, and
the movable member is movable relative to the base member from the second pulling position to the release position in response to the release of the operating member from the second operated position.

* * * * *